United States Patent
Borenstein et al.

(10) Patent No.: US 9,628,419 B2
(45) Date of Patent: Apr. 18, 2017

(54) SYSTEM FOR ANNOTATION OF ELECTRONIC MESSAGES WITH CONTEXTUAL INFORMATION

(71) Applicant: MIMECAST NORTH AMERICA, INC., Watertown, MA (US)

(72) Inventors: Nathaniel Borenstein, Wexford, PA (US); Marc Amphlett, Kettering (GB); Clive Jordan, Auckland (NZ); Max Linscott, London (GB); Niall O'Malley, Surrey (GB); Jacqueline Osborne, Surrey (GB); Luke Pentreath, London (GB); Oliver Scott, London (GB); Rahul Sharma, London (GB)

(73) Assignee: MIMECAST NORTH AMERICA, INC., Watertown, MA (US)

(*) Notice: Subject to any disclaimer, the term of this patent is extended or adjusted under 35 U.S.C. 154(b) by 0 days.

(21) Appl. No.: 14/813,034

(22) Filed: Jul. 29, 2015

(65) Prior Publication Data
US 2017/0034087 A1    Feb. 2, 2017

(51) Int. Cl.
H04L 12/58    (2006.01)
(52) U.S. Cl.
CPC .................... H04L 51/08 (2013.01)
(58) Field of Classification Search
None
See application file for complete search history.

(56) References Cited

U.S. PATENT DOCUMENTS

| | | | |
|---|---|---|---|
| 8,554,873 B1* | 10/2013 | Ganesh | G06Q 30/0261 709/206 |
| 8,762,302 B1* | 6/2014 | Spivack | G06N 5/046 706/12 |
| 8,935,192 B1* | 1/2015 | Ventilla | G06N 5/04 706/45 |
| 9,467,410 B2 | 10/2016 | Liebmann et al. | |
| 2007/0136245 A1* | 6/2007 | Hess | G06F 17/30053 |

(Continued)

OTHER PUBLICATIONS

Jurafsky, "Text Classification and Naïve Bayes", Powerpoint Presentation, 2012, 74 slides.

(Continued)

*Primary Examiner* — Greg C Bengzon
(74) *Attorney, Agent, or Firm* — Arc IP Law, PC; Joseph J. Mayo

(57) ABSTRACT

A system that transforms electronic messages into annotated messages that include contextual information to aid a recipient in utilizing the electronic message, understanding its meaning, and responding to the message. Annotations are additions or modifications to the original message with contextual information that is related to the features and contents of the original message. Message features are extracted and used to search one or more sources of contextual information. Relevant items are retrieved and added to the message, for example as attachments, hyperlinks, or inline notes. Machine learning techniques may be used to generate or refine modules for feature extraction and information selection. Feedback components may be used to track the usage and value of annotations, in order to iteratively improve the annotation system.

16 Claims, 17 Drawing Sheets

(56) References Cited

U.S. PATENT DOCUMENTS

| | | | | |
|---|---|---|---|---|
| 2007/0198951 A1* | 8/2007 | Frank | G06F 17/30017 | 715/838 |
| 2007/0239831 A1* | 10/2007 | Basu | G06F 3/0483 | 709/206 |
| 2008/0010605 A1* | 1/2008 | Frank | G06F 17/30241 | 715/765 |
| 2008/0065685 A1* | 3/2008 | Frank | G06F 17/3087 | |
| 2008/0182598 A1* | 7/2008 | Bowman | G01C 21/26 | 455/466 |
| 2009/0112457 A1* | 4/2009 | Sanchez | G01C 11/34 | 701/533 |
| 2009/0112608 A1* | 4/2009 | Abu-Hakima | G06F 9/4868 | 705/345 |
| 2009/0177745 A1* | 7/2009 | Davis | G06Q 10/107 | 709/204 |
| 2009/0292785 A1* | 11/2009 | Leedberg | G06Q 10/107 | 709/206 |
| 2010/0205061 A1* | 8/2010 | Karmarkar | G06Q 30/02 | 705/14.64 |
| 2011/0014933 A1* | 1/2011 | Karmarkar | H04M 1/72547 | 455/466 |
| 2011/0035681 A1* | 2/2011 | Mandel | G06Q 10/107 | 715/752 |
| 2011/0238762 A1* | 9/2011 | Soni | G01C 21/3679 | 709/206 |
| 2012/0105475 A1* | 5/2012 | Tseng | G01C 21/3611 | 345/633 |
| 2012/0136923 A1* | 5/2012 | Grube | G06Q 10/06315 | 709/203 |
| 2012/0278164 A1* | 11/2012 | Spivack | G06Q 10/10 | 705/14.52 |
| 2013/0096813 A1* | 4/2013 | Geffner | H04W 4/003 | 701/117 |
| 2013/0166280 A1* | 6/2013 | Quast | G06F 17/241 | 704/9 |
| 2013/0174058 A1* | 7/2013 | Kaul | G06F 3/0481 | 715/753 |
| 2013/0226453 A1* | 8/2013 | Trussel | H04L 51/20 | 701/533 |
| 2013/0275429 A1* | 10/2013 | York | G06F 17/30029 | 707/737 |
| 2013/0290339 A1* | 10/2013 | LuVogt | G06F 17/30867 | 707/740 |
| 2013/0298038 A1* | 11/2013 | Spivack | H04L 65/403 | 715/753 |
| 2013/0339000 A1* | 12/2013 | Zhang | G06F 17/277 | 704/9 |
| 2014/0040374 A1* | 2/2014 | Olsen | H04L 67/306 | 709/204 |
| 2014/0046976 A1* | 2/2014 | Zhang | G06F 17/30483 | 707/772 |
| 2014/0055491 A1* | 2/2014 | Malamud | G06T 19/006 | 345/633 |
| 2014/0129239 A1* | 5/2014 | Utter, II | G06Q 50/22 | 705/2 |
| 2014/0129331 A1* | 5/2014 | Spivack | G06Q 30/0269 | 705/14.53 |
| 2014/0164529 A1* | 6/2014 | Kleppmann | H04L 29/08072 | 709/206 |
| 2014/0171039 A1* | 6/2014 | Bjontegard | H04L 29/06034 | 455/414.1 |
| 2014/0188541 A1* | 7/2014 | Goldsmith | G06Q 10/06 | 705/7.19 |
| 2015/0026260 A1* | 1/2015 | Worthley | G06Q 10/10 | 709/204 |
| 2015/0058324 A1* | 2/2015 | Kauwe | G06Q 50/01 | 707/722 |
| 2015/0100893 A1* | 4/2015 | Cronin | G06Q 10/06316 | 715/751 |
| 2015/0112709 A1* | 4/2015 | Bowman | G06F 19/322 | 705/2 |
| 2015/0264093 A1* | 9/2015 | Madisch | H04L 65/403 | 715/753 |
| 2015/0304437 A1* | 10/2015 | Vaccari | G06F 1/3215 | 709/204 |
| 2015/0331997 A1* | 11/2015 | Joao | H04L 51/08 | 705/3 |
| 2016/0173428 A1* | 6/2016 | Balasubramanian | G06Q 30/0255 | 709/206 |
| 2016/0189317 A1* | 6/2016 | Papandrea | G06F 19/326 | 705/319 |
| 2016/0225059 A1* | 8/2016 | Chow | G06Q 30/0625 | |
| 2016/0259902 A1* | 9/2016 | Feldman | G06F 19/345 | |
| 2016/0342691 A1* | 11/2016 | He | G06F 17/2247 | |
| 2016/0360336 A1* | 12/2016 | Gross | H04W 4/001 | |
| 2016/0371791 A1* | 12/2016 | Lee | G06Q 50/01 | |

OTHER PUBLICATIONS

Hofmann, "Probabilistic Latent Semantic Indexing", International Computer Science Institute, Berkley, CA, 1999.
Blei, "Introduction to Probabilistic Topic Models", Princeton University, 2011.
Dietz, et al., "Utilize Probabilistic Topic Models to Enrich Knowledge Bases", Fraunhofer Integrated Publication and Information Systems Institute (IPSI); Darmstadt, Germany; 2006.
Chen, et al., "On the similarity metric and the distance metric", Theoretical Computer Science, vol. 410, Issues 54-25, May 2009, pp. 2365-2376.

* cited by examiner

FIG. 3

From: A1 (a1@xyzcorp.com), A2
(a2@xyzcorp.com)
To:   B1 (b1@mit.edu), B2
(b2@stanford.edu)
In-Reply-To:
<20140327229492.X.Y@xyzcorp.com>
Received: 3/22/2014

Flag: Urgent
Subject: Our upcoming meeting

Location: 77 Massachusetts Ave.,
Cambridge, MA

Time: 10:30 AM, 3/26/2014

📎 Participant list
📎 CVs of Participants

Hello, attached please find
background information for our
upcoming meeting. Here is a map:

Attachment: CVs of Participants

A1:
CEO and Founder of XYZ Corp
Previous Positions: Bodybuilder
Education: PhD Economics, Oxford
Publications: "Making a Fortune"
..etc.

A2:
Director of Marketing, XYZ Corp
Previous Positions: Waiter
Education: La Jolla High School
..etc.

B1: b1-mit.mycvonline.org
B2: b2-stanford.mycvonline.org

FIG. 4

```
From:  A1 (a1@xyzcorp.com), A2 (a2@xyzcorp.com)
To:    B1 (b1@mit.edu), B2 (b2@stanford.edu)
In-Reply-To: <20140322229492.X.Y@xyzcorp.com>
Received: 3/22/2014

Flag: Urgent
Subject: Our upcoming meeting

Location: 77 Massachusetts Ave., Cambridge, MA

Time: 10:30 AM, 3/26/2014

📎 Participant list

Hello, attached please find background information for
our upcoming meeting. Here is a map:
```

---

A1 is CEO and Founder of XYZ Corp. ← 303
Previous Positions: Bodybuilder
.. etc.

A2 is Director of Marketing at XYZ Corp. .. etc.

B1's CV can be found at b1-mit.mycvonline.org

B2's CV can be found at b2-stanford.mycvonline.org ← 304

```
from: Humpty Dumpty
to:   Alice

'Twas brillig, and the slithy toves
Did gyre and gimble in the wabe;
All mimsy were the borogoves,
And the mome raths outgrabe.

'Beware the Jabberwock, my son!
The jaws that bite, the claws that catch!
Beware the Jubjub bird, and shun
The frumious Bandersnatch!'

He took his vorpal sword in hand:
Long time the manxome foe he sought --
So rested he by the Tumtum tree,
And stood a while in thought.

And, as in uffish thought he stood,
The Jabberwock, with eyes of flame,
Came whiffling through the tulgey wood,
And burbled as it came!

One two! One two! And through and through
The vorpal blade went snicker-snack!
He left it dead, and with its head
He went galumphing back.

'And hast thou slain the Jabberwock?
Come to my arms, my beamish boy!
Oh frabjous day! Callooh! Callay!'
He chortled in his joy.....
```

503 — ignore:
'the'
'and'
'in'

→ Feature Extraction Module ← 130

501 —

1-grams
('he', 7)
('jabberwock', 3)
('through', 3)
('my', 3)
('gyre', 2)
('raths', 2)
('vorpal', 2)
('slithy', 2)
('toves', 2)
('mome', 2)
('brillig', 2)
('borogoves', 2)
('mimsy', 2)
('outgrabe', 2)
...

502 —

2-grams
(('borogroves', 'mome'), 2)
(('slithy', 'toves'), 2)
(('gyre', 'gimble'), 2)
(('raths', 'outgrabe'), 2)
(('one', 'two'), 2)
(('toves', 'did'), 2)
(('mome', 'raths'), 2)
(('mimsy', 'were'), 2)
(('twas', 'brillig'), 2)
...

135

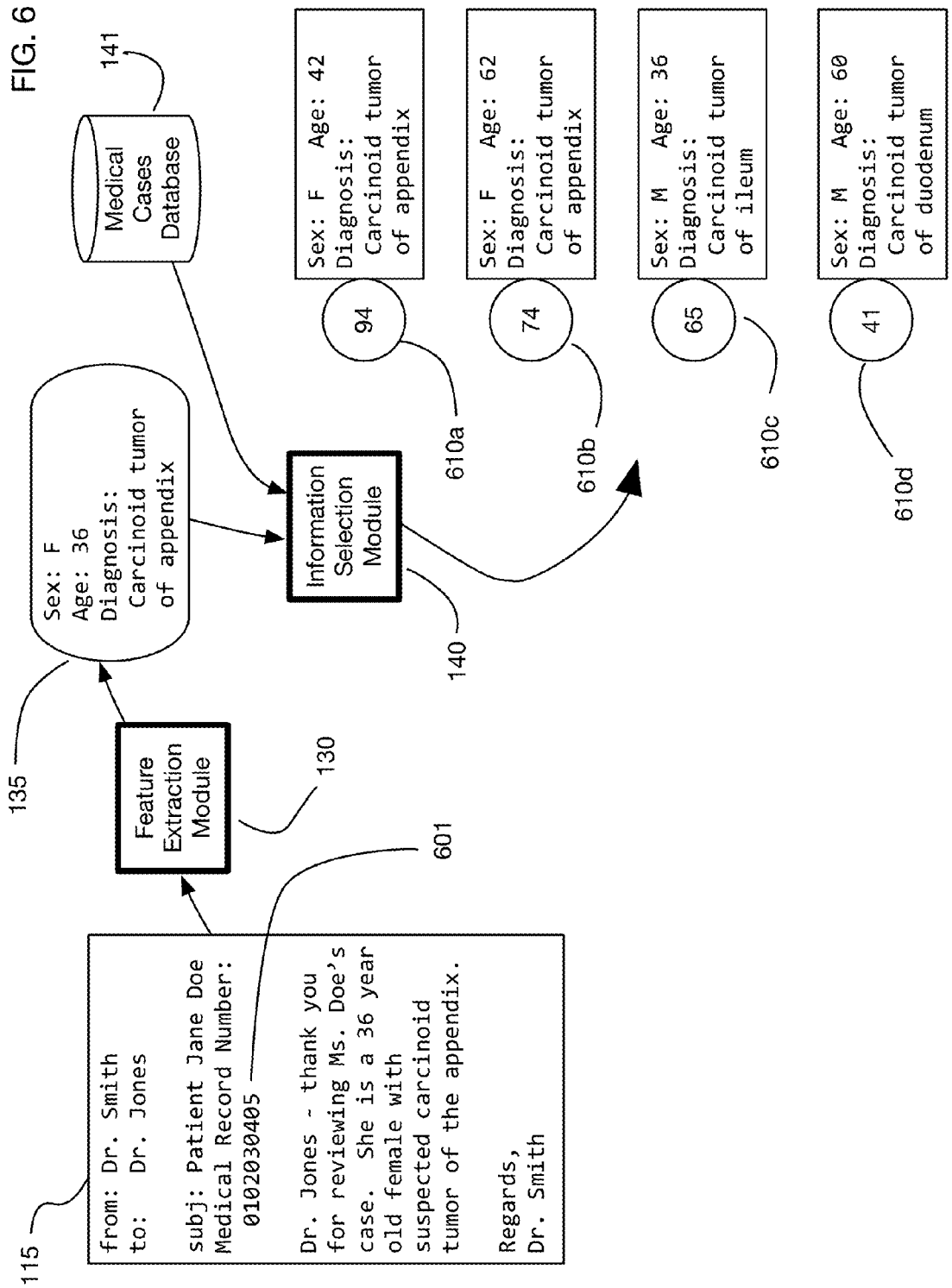

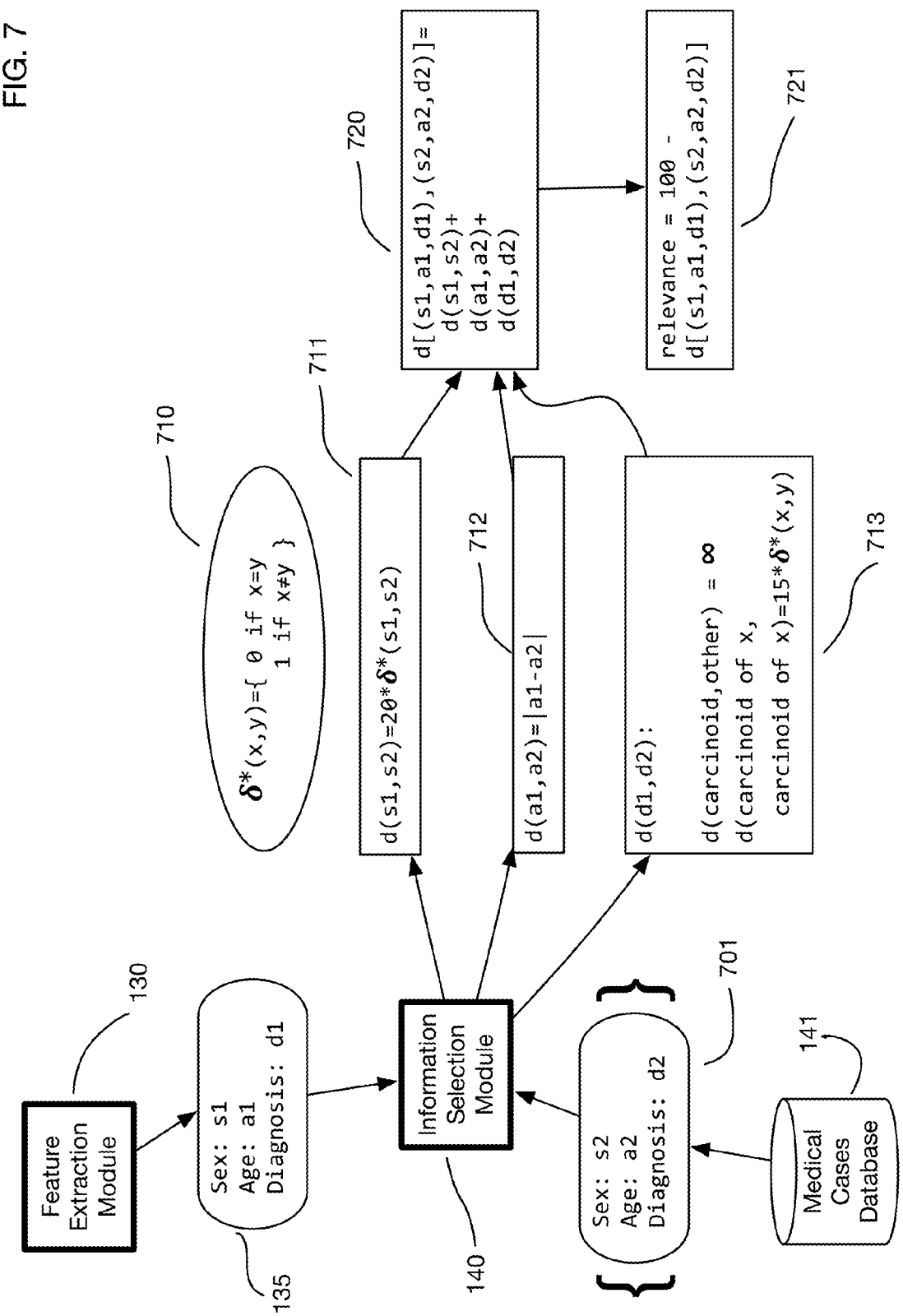

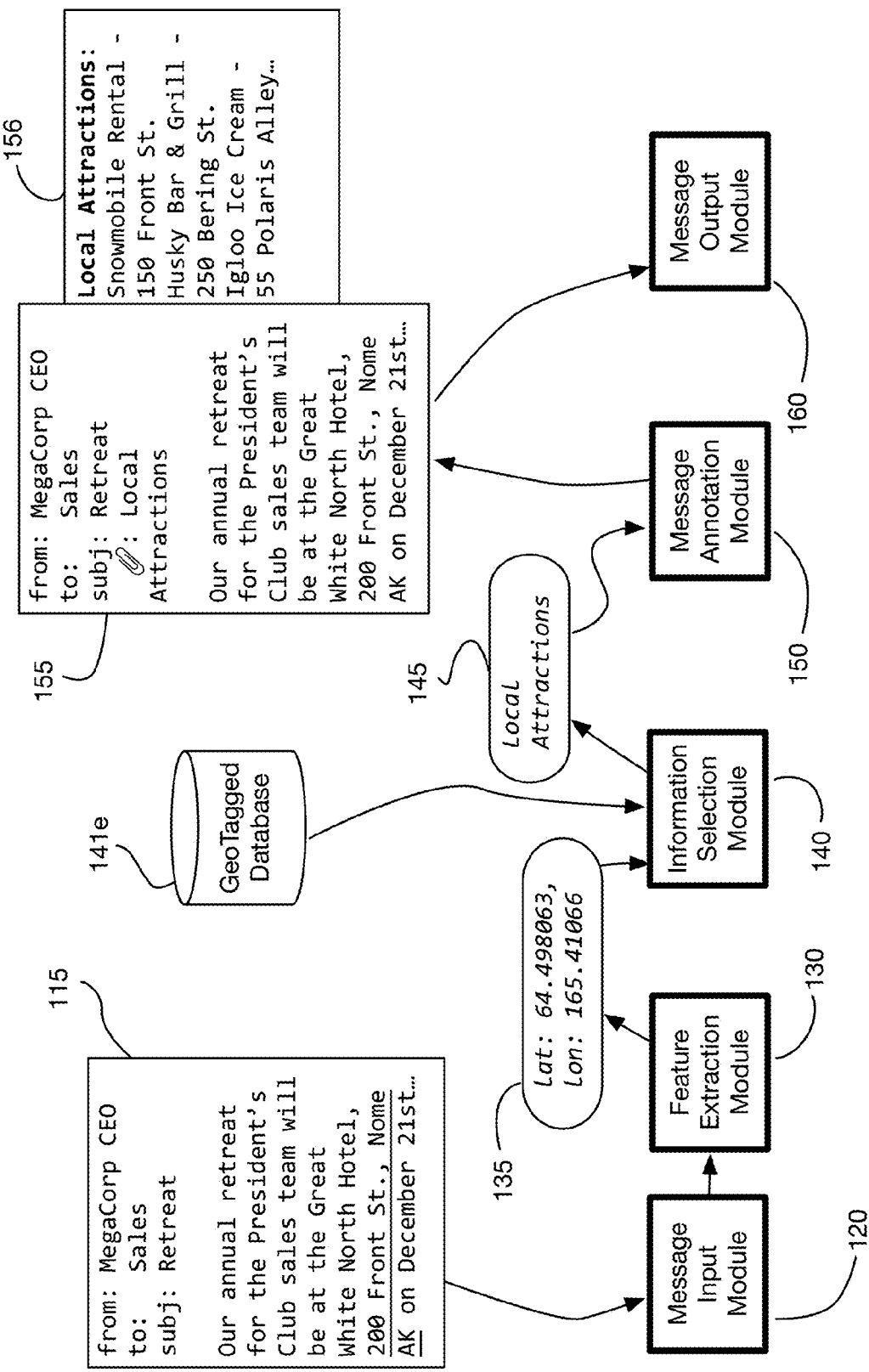

SYSTEM FOR ANNOTATION OF ELECTRONIC MESSAGES WITH CONTEXTUAL INFORMATION

BACKGROUND OF THE INVENTION

Field of the Invention

One or more embodiments of the invention are related to the field of data processing and electronic messaging systems. More particularly, but not by way of limitation, one or more embodiments of the invention enable a system for annotation of electronic messages with contextual information, which transforms the electronic messages into annotated messages with added information related to the original message to provide a context for the electronic message to aid a recipient in utilizing the electronic message, understanding its meaning, and responding to the electronic message.

Description of the Related Art

Existing systems that enable communication of electronic messages include email, instant message, text message, calendar, and audio and video messaging systems. These systems are designed to transmit messages to a recipient, or for communications between two individuals, between a sender and a receiver. Transformations made to messages by a communication system, such as encryption or compression, are designed to be transparent to the recipient.

Recipients of messages frequently need to search manually for information related to the messages to provide context for the messages. Alternatively the sender of a message may anticipate some of the recipients' contextual information needs, and perform these searches prior to sending the message. In either case, users, such as the senders, receivers, or both, need to manually determine the contextual information needs associated with a message, perform searches for this information, and integrate the information with the message.

There are no known systems that automatically transform messages by adding relevant information for the recipients. There are no known systems that extract meaning and context from messages and use this extracted data to search for contextual information. There are no known systems that annotate messages automatically with relevant data derived from the message context.

For at least the limitations described above there is a need for a system that annotates electronic messages with contextual information to provide a context for the electronic message to aid the recipient in utilizing the electronic message, understanding its meaning, and responding to the message.

BRIEF SUMMARY OF THE INVENTION

One or more embodiments described in the specification are related to a system for annotation of electronic messages with contextual information. Embodiments of the system transform electronic messages into messages with annotations that provide additional contextual information for the recipients. These annotations are selected automatically based on analysis of the message's contents, other message artifacts, and other available information such as files, user profiles, databases, and message archives. They are added to a message for example as attachments, hyperlinks or as additional text inserted into the message contents. Recipients therefore receive a richer, more complete message with relevant data related to the original message to aid the recipients in utilizing the electronic message, understanding its meaning, or responding to the message. The system provides productivity gains by eliminating the manual effort required by senders or receivers of messages to search for and screen relevant contextual data.

For example, one or more embodiments of the system may be utilized in medical applications that annotate messages referring to a medical case with information about related or similar cases, or with background information on the conditions or treatments associated with the case. For example, the contextual information may include medical imagery similar to X-rays or other scans in the original message, to enable faster diagnosis, or information as to how a particular medical situation was treated in the past, or how the injury may have been obtained. The information may include potential remedies based on the original message, including any equipment or drugs utilized previously with good effect or bad effect.

Embodiments may also be utilized in real estate applications that annotate messages with recent information about a particular house or neighborhood, potential buyers for the type of property listed in the message, or "comps" or comparable listings for the particular house or neighborhood.

Embodiments may also be utilized in police or emergency worker applications that annotate messages to include geo-location data, such as for example crime hot spots or recent locations of criminals or accidents. One or more embodiments may for example annotate a message referencing a location with the identities of individuals that have recently been within a predefined distance from the location, for example as obtained from security cameras near the location, or from cell phones or other location-detecting devices that track people's locations. Embodiments may utilize face recognition for faces in images obtained from security cameras or social media posts to add context to the message associated with a crime or emergency scene.

Similarly, one or more embodiments may include legal applications that annotate messages referring to a legal case or action, for example with information about related or similar cases, background information on the law associated with the case, background or contact information for the parties to the action, or the case file for the action.

Embodiments of the system may operate on any type of electronic message, including for example, without limitation, an email message, an instant message, calendar message, social media message, a text message, a picture message, a voice message, a voicemail, a video message, a chat message, and a video call message. Electronic messages in the form of social media messages may include a posting to a social networking site, a blog, a wiki, an RSS feed, a mailing list, a newsgroup, or any other information repository. Senders and receivers of messages may be persons, and they may be automated systems, repositories, databases, groups, or any other systems that generate or receive information.

Electronic messages contain one or more message "artifacts," which are portions or elements of the message. Any portion of a message or data related to a message may be a message artifact. Types of message artifacts may include, without limitation, senders, sender addresses, sender organizations, recipients, recipient addresses, recipient organizations, message subjects, message contents, message body parts, message threads associated with a message, events, timestamps, locations, links, dates, times, importance indicators, media, media types, message metadata, and attachments.

Examples of potential annotations may include for example, similar documents, related cases or projects, other users working on or interested in the same or similar topics, background information, detailed documents supporting summaries in a message, and other documents authored by senders or recipients of the message. Annotations may also be derived from or include information contained in communication archives, geo-location related information, public information in commercial and private databases, news, social media databases or any other context related information source for example. Annotations may also be for example active links to websites, databases, search engines, or forms, potentially with search fields or form fields pre-populated based on the message or the message context.

Embodiments of the system may contain several modules that collectively transform a message into an annotated message. These modules execute on a hardware platform with processors, memory, and network interfaces. Embodiments may use any desired number and types of processors, memory devices, and network interfaces. One or more embodiments are distributed systems with modules executing over multiple processors, possibly in multiple locations, communicating and coordinating their activities over a network. Networks may be wired or wireless, and may use any desired media and protocols. Embodiments may also use multiple networks and mixed network types.

One or more embodiments of the system may transform a message into an annotated message on the processor or processors used by or available to a message sender. In one or more embodiments the message sender may therefore be able to review and modify the annotated message prior to sending the annotated message. Alternatively, or in addition, one or more embodiments may transform a message into an annotated message after it has been sent; for example, a message may be transformed into an annotated message on the processor or processors of a message recipient, or any any processors in the network path between the sender and the recipient. Embodiments may use any desired combination of transformations at the sending end of the transmission path, at the receiving end of the transmission path, or at any node along the transmission path.

One or more embodiments may contain the following modules: A Message Input Module that accepts incoming messages; A Feature Extraction Module that analyzes the message and generates a set of features describing the message; An Information Selection Module that selects relevant contextual information items from one or more Contextual Information Sources accessible to the system (potentially over network connections); A Message Annotation Module that adds the selected items to the message; and A Message Output Module that transmits the annotated message to the recipients.

In one or more embodiments of the system, the Message Input Module accepts or otherwise retrieves messages from any of the types of information sources available. The message is then sent to the Feature Extraction Module for analysis.

In one or more embodiments of the system, the Feature Extraction Module analyzes the message artifacts of the message received by the Message Input Module, and generates a set of features associated with these artifacts. Embodiments may use any number and type of features to describe the message. Examples may include, without limitation, word counts, keywords, key phrases, inferred topics, characteristics of senders or receivers, and any data items referenced in a message or derived from any of the message artifacts. One use of the features is to characterize the message so that relevant contextual data for the message can be located. Finding this relevant contextual data is the role of the Information Selection Module.

The Information Selection Module has an interface to one or more Contextual Information Sources. These sources may be internal to the system, or external to the system. Sources may be proprietary or open, public or private, and unsecured or secured. They may include for example, without limitation, websites, databases, repositories, archives, file systems, publications, wikis, logs, blogs, news feeds, RSS feeds, mailing lists, contact lists, or any other source of potentially relevant data. The Information Selection Module searches these sources using the message features, and it retrieves a set of contextual information items that appear to be relevant for the message. These items are then passed to the Message Annotation Module.

The Message Annotation Module transforms the original message by adding the selected contextual information items. Embodiments may execute these transformations in various ways, including for example, without limitation, attaching items to a message, modifying the text of a message, modifying subject lines of a message, adding new recipients to a message, or highlighting text in a message or otherwise modifying the message format. Embodiments may insert information inline or via references, hyperlinks, attachments, or added or modified message body parts.

The Message Output Module transmits the now annotated message to the original recipients, and potentially to other recipients identified during the annotation process.

Specifically, one or more embodiments of the Feature Extraction Module generate word or symbol or phrase "n-grams" to form part of the feature set for the message. N-grams are sequences of items extracted from the message; for example, word 1-grams are individual words, and word 2-grams are consecutive word pairs. One or more embodiments may use frequency distributions of n-grams in the message to locate relevant items from the Contextual Information Sources. For example, relevant items may be selected as those with similar n-gram frequency distributions to those of the message.

One or more embodiments of the Information Selection Module select relevant contextual information items by calculating, assigning, or retrieving a relevance score for each item based on the message features, and then ranking items by their relevance scores. A set of top-ranked items may be selected to add to the message as annotations. In some embodiments the Information Selection Module may perform one or more initial queries to generate a set of possibly relevant items, and then calculate relevance scores for that set only. Embodiments may use any method, formula, or algorithm to calculate relevance scores.

In one or more embodiments, relevance scores may be derived from a distance metric or a similarity metric. A distance metric measures how far apart items are in some "feature space;" a similarity metric is the reverse: it measures how close items are in a feature space.

In one or more embodiments the Information Selection Module may use one or more external search engines to locate or rank a set of possibly relevant contextual information items. Search terms for the search engines may be derived from the message features. Top-ranked results from search engine queries may be added to the message as annotations.

In some embodiments, one or more of the Contextual Information Sources may be protected with access rules that limit who can view information from the sources. In some of these embodiments, the Feature Extraction Module may include the recipient or recipients of the message as well as their organizations and access credentials in the set of features passed to the Information Selection Module. The Information Selection Module may then retrieve information from a protected Contextual Information Source only for those recipients that have access to that information. In some embodiments the Information Selection Module may need to log in or otherwise gain access to a secured information source; gaining access may for example use the credentials of the senders or receivers, or use credentials configured for the system overall. Annotated messages may therefore be different for different recipients, since the Message Annotation Module may selectively add protected information only to the messages sent to recipients authorized to view this information.

One or more embodiments may customize annotations by recipient based on any characteristics of the recipients, including but not limited to each recipient's access to secured information. For example, recipients from different organizations may receive different annotations based on policies of the receiving organizations. One or more embodiments may provide configuration options to collect preference information from recipients; embodiments may then use this preference information to customize annotations for each recipient. For example, one recipient may prefer very terse annotations, while another may prefer verbose annotations; the system may take these preferences into account in creating annotations for each recipient.

One or more embodiments of the system may incorporate one or more classifiers into the Feature Extraction Module. A classifier categorizes the message or an artifact of the message into one or more classes. These classes may then be used to modify the subsequent feature extraction or information selection processes. Some embodiments may employ probabilistic classifiers, which assign a probability that a message (or a message artifact) is in each possible class. In one or more embodiments, message annotation may be based in part on the class probabilities. For example, annotation of a message may occur only if a message is classified into a specific class with a sufficiently high probability; the system may choose to skip or limit annotations if the classifier shows significant uncertainty about the correct class of a message.

One or more embodiments of the system may use a probabilistic topic model to classify messages into topics. A probabilistic topic model views a message as a mixture of topics, and it uses word frequencies to determine the mixture. One or more embodiments may also use a probabilistic topic model to generate the topic model that defines the set of topics and the word frequencies for each topic.

One or more embodiments of the system may incorporate a Machine Learning Module into the system to generate or refine the methods used by the Feature Extraction and Information Selection Modules. Embodiments may use, create, or access a training set of examples for the Machine Learning Module. For example, a training set may consist of a set of example messages with example annotations that are known to be relevant. A training set may for example be extracted from message archives of senders, receivers, or message delivery or storage services. The Machine Learning Module may use any of the machine learning techniques known in the art to develop generalized methods from a training set.

One or more embodiments of the system may incorporate a Feedback Module into the system that tracks whether and how recipients use the annotations added to messages. For example, one or more embodiments may track when recipients download or view attachments that are added to messages as annotations. One or more embodiments of the Feedback Module may provide direct user feedback mechanisms to allow users to indicate or rate the usefulness of the annotations or to provide comments on the annotation system. In some embodiments the Feedback Module may provide feedback data to the Machine Learning Module to improve feature extraction and information selection for future message annotations.

One objective of some embodiments of the system is to provide recipients with data that they would otherwise need to search for themselves. To improve the system's information selection and annotation capabilities, one or more embodiments of the system may monitor a recipient's searches for and uses of information after he or she receives a message. This data may be provided to the Feedback Module to incorporate into training set data to improve future annotations.

One or more embodiments of the system may include media-processing capabilities. For example, some embodiments of the Feature Extraction Module may analyze images contained in message artifacts, and extract sub-images of interest or other image features of interest. Some embodiments of the Information Selection Module may access Contextual Information Sources that include image databases, and they may use image-matching techniques to find similar images to those in a message or to identify sub-images extracted by the Feature Extraction Module. Additional information about objects identified using image matching may be provided as annotations to the message. One or more embodiments may include similar searching and matching capabilities for audio, video, or any other media contained in message artifacts. Embodiments may identify segments of interest in these media that may represent objects of interest, and search Contextual Information Sources for matching objects or matching segments. As an example, a message may contain an audio recording that includes a fragment of a song. An embodiment of the system may for example scan the audio recording to extract the segment associated with the song, search a database of song audio to identify the song, and annotate the message with detailed information on the song, such as for example the lyrics, author, singer, publisher, and sheet music.

One or more embodiments of the system may use location data in a message to find information about items within a predefined proximity to the locations mentioned in the message. Temporal settings may be utilized to indicate how far back in time to search for contextual information. In some embodiments the Feature Extraction Module may find or access locations in message artifacts and convert them to various geographical data formats (such as latitude and longitude); the Information Selection Module may then access Contextual Information Sources with geo-tagged data to find information about the location or about items in proximity to the location, for example within a given time period before the message was received by the system. This location-based information may then be added to the message as annotations.

One or more embodiments may derive relevant locations from other information in a message. For example, if a message is sent between two users proposing a meeting, the system may recognize that the office locations of each user are relevant features for the message. Information about those locations may therefore be added as annotations to the message. For example, an embodiment may add a map automatically to a message about a meeting at the sender's office, where the location is derived from known information about the sender. One or more embodiment may combine location information with additional information extracted from the message to generate annotations. For example, if a message is sent between two users proposing a meeting for lunch, an embodiment may generate a list of restaurants near one or both of the user's offices and include this list as an annotation. Moreover, if it is known that one of the users is for example a vegetarian, an embodiment may limit its restaurant search to vegetarian restaurants or restaurants serving vegetarian options. One or more embodiments of the system may combine message features with any additional information about users or other context to determine relevant annotations.

BRIEF DESCRIPTION OF THE DRAWINGS

The above and other aspects, features and advantages of the invention will be more apparent from the following more particular description thereof, presented in conjunction with the following drawings wherein:

FIG. 3 illustrates an embodiment of the system that annotates messages using attachments.

FIG. 4 illustrates a variation of the embodiment shown in FIG. 3, which annotates a message by inserting information directly into the message contents.

FIG. 5 illustrates an embodiment of a feature extraction module of the system that extracts features as 1-grams and 2-grams of the words in the message contents.

FIG. 6 illustrates an embodiment of the system used for medical applications; this embodiment extracts keywords and uses them to find medical cases similar to the one described in the message.

FIG. 7 illustrates an embodiment of a distance function used to generate relevance scores to rank the matching cases in FIG. 6.

FIG. 17 illustrates an embodiment of the system that uses geo-tagged data to find information about items in proximity to a location mentioned in a message.

DETAILED DESCRIPTION OF THE INVENTION

A system for annotation of electronic messages with contextual information will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
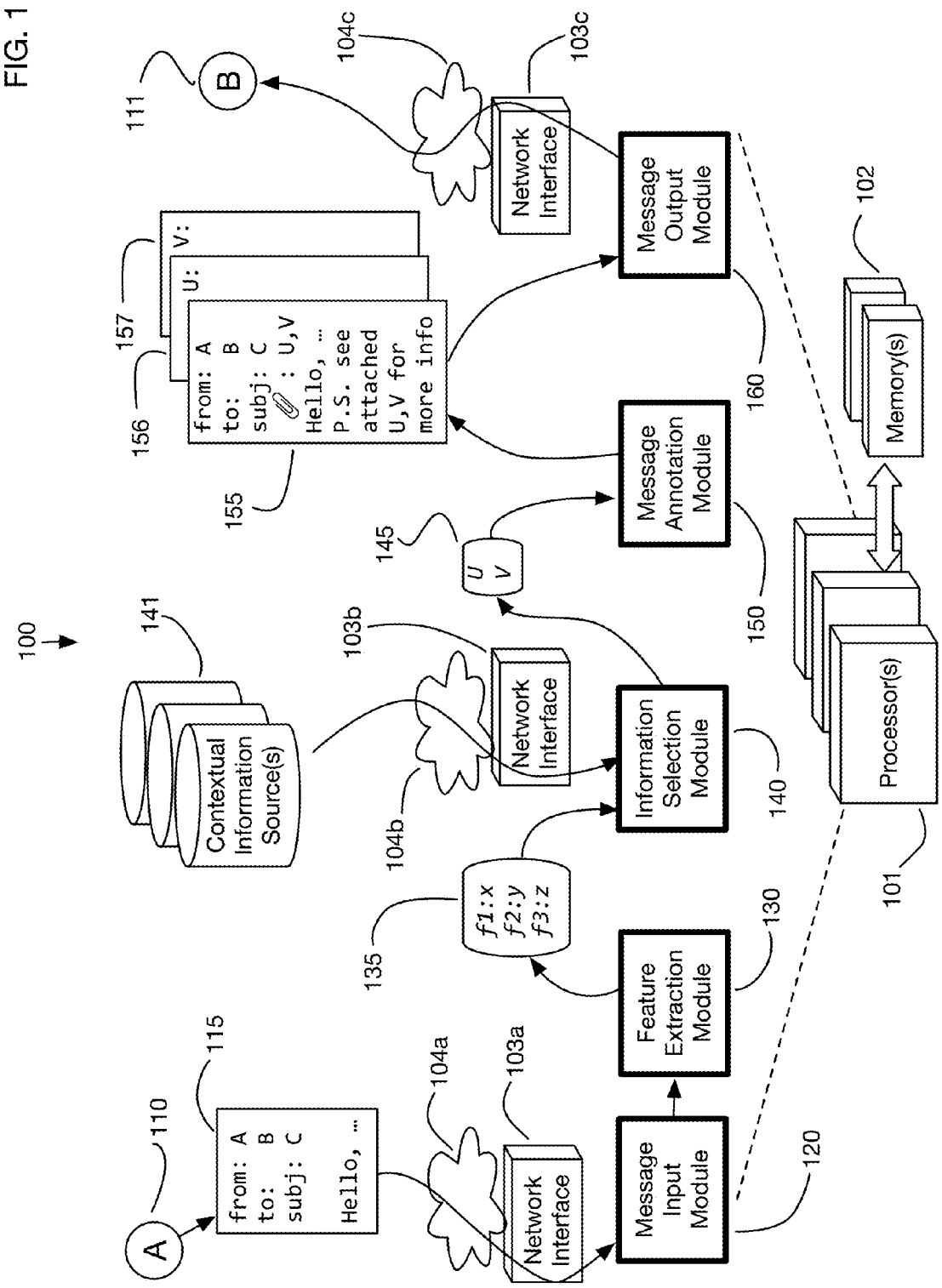
FIG. 1 illustrates an architectural overview of at least one embodiment of the system for annotation of electronic messages with contextual information.

FIG. 1 shows an architectural overview of an embodiment of the system 100. Hardware elements of the system include processors 101, memory elements 102, and network interfaces 103a, 103b, 103c. Embodiments of the system may operate using a single processor, a multiprocessor, or a networked system of processors. Modules of the system and components of these modules may be distributed across processors in any manner appropriate for an application. Processors may include for example, without limitation, microprocessors, personal computers, laptops, notebook computers, desktop computers, server computers, mainframe computers, minicomputers, quantum computers, distributed systems of computers and devices, mobile phones, personal digital assistants, tablets, special-purpose hardware, embedded processors in any consumer or industrial device, or any other device or collection of devices capable of receiving, analyzing, transforming, or transmitting electronic messages. Processors 101 utilize memory elements 102, which may include for example random access memory, read-only memory, solid-state drives, quantum storage devices, rotational disk drives, tape drives, optical drives, or any other memory or storage media or devices. Memory elements may store data, programs, or both. Processors 101 may communicate with each other and with other systems using network interfaces. The example illustrated in FIG. 1 shows three network interfaces 103a, 103b, and 103c. Embodiments may use any desired number of network interfaces. In FIG. 1, network interface 103a is connected to network 104a; network interface 103b is connected to network 104b, and network interface 103c is connected to network 104c. Embodiments may interface with a single network or with multiple networks. Any type of network or networks may be used for communications, including for example, without limitation, wired or wireless networks, LANs, WANs, PANs, MANs, cable networks, broadcast television or radio networks, satellite networks, telephone networks, Bluetooth networks, 802.11 networks, Ethernet networks, cellular networks, USB networks, RS232 networks, optical networks, or any other network capable of transmitting electronic messages using any desired protocols and media. Embodiments may use any combinations of network types; for example, an embodiment may use a wired LAN network to access contextual information sources, and use wireless cellular networks for message transmission.

FIG. 1 illustrates an embodiment that uses a combination of modules to transform electronic message 115 into electronic message 155 that is annotated with contextual information. Sender 110 (A) sends message 115 to one or more recipients. Sender A may be recipient 111 (B) in one or more scenarios, for example in the scenario of a Calendar message from a calendar entry entered into a calendar program by a user. Electronic message 115 may be any type of electronic message, including for example, without limitation, an email message, an instant message, a text message, a fax, a telegram, a social media message, a picture message, a voice message, a voicemail, a video message, a chat message, or other video call message. In the embodiment shown in FIG. 1, message 115 is sent to recipient 111 (B). Embodiments may support messages that are sent to multiple recipients, including broadcast messages that are sent to distribution lists or to groups of recipients at any broadcast address. In some embodiments the recipient or recipients of a message may be or may include automated systems or repositories. In some embodiments an electronic message may be a posting to a social networking site, a blog, a wild, an RSS feed, a mailing list, a newsgroup, a document repository, a local or remove file system, or any other information repository.

The functionality of the embodiment shown in FIG. 1 is implemented in the following modules: the Message Input Module 120, the Feature Extraction Module 130, the Information Selection Module 140, the Message Annotation Module 150, and the Message Output Module 160. FIG. 1 illustrates these modules acting in sequence. In other embodiments the order of module operation may be different. Modules may also operate in parallel, or iteratively. In some embodiments some of the modules may be missing or their functions may be combined with other modules. Modules may execute on any or all of the processors of the system. In particular modules may execute on processing nodes associated with a message sender, or on processing nodes associated with a message recipient, on any processing nodes in the transmission path between a sender and a receiver, or on any processing nodes accessible to any components of the system. In some embodiments transformed messages may be visible to the sender of a message prior to sending the annotated messages to the recipients. In some embodiments transformed messages may be visible to the sender of a message after it has been sent to or delivered to one or more recipients. In some embodiments the sender or senders of a message may be able to review and edit message annotations before they are sent to recipients.

In FIG. 1 Message Input Module 120 receives message 115 using network interface 103a, which is connected to network 104a. For example, if message 115 is an email, Message Input Module 120 may be integrated into any email gateway or email client in a communications path between a sender 110 and a recipient 111. Message Input Module 120 passes the message to Feature Extraction Module 130. The Feature Extraction Module analyzes the message and extracts a relevant set of features 135. The specific features extracted may vary across embodiments. Examples of features may include, without limitation, key words and phrases, parse trees generated from message text, items representing times or locations, identities and characteristics of the senders or the recipients, and features extracted from media attached to or embedded in the message, such as specific types of images or other media. In FIG. 1 the feature list 135 has three features f1, f2, and f3 with values x, y, and z. The number of features shown is for illustration only; embodiments may use any desired number and types of features. The number of features extracted may also be variable depending on the message. Feature values may be of any type, including, without limitation, numeric, textual, Boolean, image, video, audio, or complex data types such as lists, matrices, trees, tables, or maps.

Features 135 are provided to Information Selection Module 140. The role of the Information Selection Module is to select a relevant set of contextual information that will be added to the message as an annotation. As with feature extraction, the specific methods used by the Information Selection Module may depend on the application. In general, the system may include an interface to one or more Contextual Information Sources 141 that provide the possible data for annotations. Information sources may be internal to the system or external to the system. Examples of contextual information sources may include, without limitation, databases, file repositories, personal archives, corporate or organizational archives, websites, the entire World Wide Web or subsets thereof, mail archives, news feeds, media repositories or databases, local or remote filesystems, contact lists, publications, journals, social media sites, or catalogs. Internal sources for a company may include for example any archives or repositories of company data or company communications. Contextual Information Sources may be highly structured, like relational databases for example, or largely unstructured, like raw document repositories. One example of an embodiment of a Contextual Information Source is the list of all electronic messages 115 received by the system; such a source may be used for example to annotate messages with other similar messages that have been received previously. In some embodiments the system may preprocess one or more Contextual Information Sources to generate indexes or other data structures to facilitate searching and retrieval.

Contextual Information Sources contain sets of contextual information items, which are the individual elements that can be retrieved and used for annotating messages. Such items may include for example, without limitation, documents, extracts, paragraphs, other messages, data items, data tables, lists, words, phrases, publications, articles, images, videos, audio clips, resumes, instructions, or web pages. Embodiments may use any desired level of granularity for contextual information items. Contextual information items may also be structured in a hierarchy or a network, where one item may include or refer to other items.

The Information Selection Module 140 uses the features 135 extracted from the message to identify appropriate and relevant contextual information items from the Contextual Information Sources 141. Any method of matching, searching, retrieving, sorting, analyzing, or inferring may be used to select appropriate items. Embodiments may use simple methods such as matching of features, or complex methods involving artificial intelligence to infer the meaning of the features and to infer relevant items to select for annotation of the message. Contextual Information Sources may be searched in parallel or serially, or using a combination of methods. In the example shown in FIG. 1, the Information Selection Module selects contextual information items 145, consisting of items U and V. The Information Selection Module provides these items to Message Annotation Module 150.

The function of the Message Annotation Module 150 is to transform the original message 115 into annotated message 155. Embodiments may use different techniques to transform messages, including adding information as attachments, or modifying or augmenting the contents or format of the original message. In the embodiment shown in FIG. 1, the Message Annotation Module adds items U and V to message 115 as attachments, resulting in message 155 with attachments 156 and 157. The Message Annotation Module also adds the postscript "P.S. see attached U,V for more info" to the message contents to inform the recipients that there is additional contextual information. Methods of annotating messages may vary depending on the type of message and on the capabilities of the messaging system. For example, in an embodiment focused on text messages that does not support attachments, inline insertion of contextual data (or links thereto) may be the preferred approach.

In the final step of the embodiment shown in FIG. 1, the annotated message 155 (with attachments 156 and 157) is provided to Message Output Module 160. This module forwards the now annotated message to the original recipients, here to recipient 111 (B), over network interface 103b. In some embodiments the annotated message may also be sent to other recipients not in the original list. For example, in an embodiment that annotates messages with journal articles, an annotated message may be sent to the articles' authors to indicate that their journal articles have been referenced and used. Embodiments may also send the annotated message to system administrators for monitoring and analysis of the message annotation system itself. Embodiments may also send the annotated message back to one or more of the senders, possibly for review and editing prior to final forwarding to recipients.

Figure 2:
FIG. 2 illustrates an example of message artifacts contained in an electronic message.

Having described the architectural overview of the embodiment of the system shown in FIG. 1, the features and operation of the system modules are now described in greater detail. The Feature Extraction Module 130 may use any element or elements of the message to generate features. These message elements are called message artifacts. The term "artifact" as used in this description is a portion or fragment of data or metadata that forms an electronic message. Any portion of data, such as any portion of an electronic communication, may be an artifact. Anything sent and received by a user of a communications application may be an artifact. FIG. 2 illustrates an example of a message containing multiple artifacts. In this embodiment the electronic message is an email message; other embodiments may use other types of messages and may have different types of artifacts associated with those messages. Message 115 has senders 201 (A1 and A2). A sender may be for example a person, an organization, or an automated system. Sender A1 has address 202, which is also an artifact. The address 202 includes an organization identifier, here "xyzcorp.com", which is also an artifact. Message 115 has recipients 203. In this example there are two recipients; in general messages may have any number of recipients. Like senders, recipients may be a person, an organization, or an automated system. The recipient address 204 is also an artifact, as is the sender organization (here "stanford.edu"). Recipients may be classified as being for example on the "to" list, the "cc" list, the "bcc" list, the "resent-to" list, the "resent-cc" list, the "resent-bcc" list, or other lists; in this case the list or lists associated with each recipient is also an artifact for the message.

Message 115 has an In-Reply-To field 205 that shows that the message is a response to a previous message. In general one or more message artifacts may identify any number of other messages in a conversation or thread associated with the message. Related messages artifacts may for example be obtained from an In-Reply-To field like 205, or from a References field that may list a set of related messages in a message thread. Related messages may also be obtained or inferred from other fields or from the message contents or other artifacts; for example, if the subject field of a message refers to the subject a previous message, then one or more embodiments may link the message with the previous message or with other messages in a message thread by correlating their subject fields. For example, when replying to a message with subject "Foo", a mail client may often generate the subject field for the reply as "Re: Foo" or some similar reference. Similarly, when forwarding a message with subject "Foo", a mail client may often generate the subject field for the forwarded message as "Fwd: Foo" or some similar reference. One or more embodiments may therefore be able to construct a message thread (or portions thereof) by comparing and correlating subject fields, or by comparing and correlating other message artifacts.

The received timestamp 206 is an artifact. Other timestamps may also be present, such as a sent timestamp or timestamps associated with events identified in the message. Urgency flag 207 is also a message artifact. The message subject 208 is an artifact; this particular artifact may be particularly useful in some embodiments to assist in classifying the message and extracting features for information selection. Message 115 refers to an upcoming meeting, and includes the location 209 and time 210 of the meeting, which are artifacts. The message has an attachment 211, which is an artifact. The contents of the attachment may include other artifacts. The contents 212 of the message is an artifact. It includes an image 213, with a MIME type 214; both the image itself and its media type are artifacts. Finally the "source data" 215 of message 115 includes various flags describing message routing and message content types. Any of this message metadata may also be used as artifacts. The examples of message artifacts shown in FIG. 2 are for illustration only; embodiments may use any portion of a message as a message artifact.

FIG. 3 illustrates an embodiment that annotates message 115 using message attachments. In this example, message 115 includes an original attachment with a participant list. The Information Selection Module extracts the CVs of the participants from a Contextual Information Source (such as a biography database), and the Message Annotation Module annotates the message with these CVs. The annotation is added as an attachment 302, with an attachment indicator 301 in the original message. In this example we show four participants: A1, A2, B1, and B2. The Message Annotation Module builds the attachment file 302 using a mixture of inline text and hyperlink references. In this example, CVs for participants A1 and A2 are inserted inline into the attachment at 303. CVs for participants B1 and B2 are not inserted inline; instead hyperlinks to these CVs are inserted at 304. Embodiments of Message Annotation Modules may use any mixture of inline annotation and annotation by reference. References may include for example hyperlinks, or other references that allow recipients to manually or automatically locate the desired information. For example, annotation with a journal article could attach or insert the journal article itself, attach or insert a link to the journal article, or attach or insert a reference to the article describing the publication, year, month, author, and page numbers of the article.

FIG. 4 illustrates a different embodiment of a Message Annotation Module operating on the message shown in FIG. 3. In FIG. 4 the Message Annotation Module inserts content into the message contents, rather than adding content as an attachment. As in FIG. 3, CVs for A1 and A2 are inserted inline at 303, and CVs for B1 and B2 are inserted as hyperlinks at 304. Other embodiments may use a mixture of modifying message contents and adding one or more attachments. Embodiments of Message Annotation Modules may apply any desired transformations to any message artifacts; for example, an embodiment may modify the subject of a message with a parenthetical remark that annotations have been added. Message Annotation Modules may also modify the format of any message artifact for example for emphasis or to highlight associated annotations.

FIG. 5 illustrates an embodiment of a Feature Extraction Module that extracts frequency distributions of word sequences in the message text to use as features. Sequences of n consecutive words from a document are referred to as "n-grams." In the embodiment shown in FIG. 2, Feature Extraction Module 130 extracts all 1-grams (single words) and 2-grams (word pairs) from the message 115, and forms the frequency distribution for these 1-grams and 2-grams. The 1-grams 501 and 2-grams 502 then form the features that will be used by the Information Selection Module. In the embodiment shown, the Feature Extraction Module also uses a list 503 of "stop words" that are ignored in forming the n-grams; stop words are typically very common words that do not help in characterizing the message contents. One or more embodiments may use n-grams of any length as features. One or more embodiments may extract n-grams from any message artifact. One or more embodiments may assign different weights to n-grams extracted from different message artifacts; for example, the subject of a message may be weighted higher compared to message contents, since the subject may provide a particularly important indicator of the message's meaning. Some embodiments may form n-grams from individual letters or from phrases or from other message components besides words. Some embodiments may also preprocess message artifacts in various ways prior to extracting features; for example, in FIG. 5 the message text is converted to lower case before extracting the 1-grams and 2-grams. Some embodiments may use tables of synonyms to transform words into a canonical synonym classes before calculating n-grams; for example, the words "large," "big," "huge," and "enormous" could be considered equivalent. Some embodiments may use natural language processing techniques to parse text into components such as clauses and phrases, and construct n-grams on these components. Some embodiments may use only the highest frequency n-grams above some threshold frequency as the message features.

FIG. 6 illustrates an embodiment of the system used for medical applications. In this embodiment, the system processes messages sent between physician concerning patients. The system extracts information about the patient's clinical condition from the message artifacts, and it annotates the message with case information for similar cases. This information may assist the recipient in diagnosing or treating the case by providing him or her with additional relevant case examples or background information.

In FIG. 6, Feature Extraction Module 130 processes message 115 and extracts the sex, age, and tentative diagnosis of the patient as features 135. In this example the contents of 115 contain information about sex, age, and diagnosis; the Feature Extraction module may therefore use natural language processing techniques known in the art to extract the relevant information. Alternatively, in this example message 115 contains a medical record number 601. The Feature Extraction Module may therefore directly access the appropriate medical record to obtain the feature information. This example illustrates that embodiments may access other information in addition to the message artifacts to form the features. In this example the message contains a reference to an external data source, the medical record repository, with an appropriate key, the medical record number, to allow the Feature Extraction Module to query the data source.

Information Selection Module 140 searches Medical Cases Database 141 to find cases that are similar to the one identified by the features 135. Each case in database 141 is assigned a relevance score based on the features 135. The cases with the top-ranked relevance scores are selected as the contextual information items that will be attached to the message. In the example in FIG. 6, four cases are selected with the highest relevance scores 610a, 610b, 610c, and 601d. None of these four cases perfectly matches the features 135; they differ from the features in age, sex, or diagnosis. The Information Selection Module uses a relevance score to quantify how relevant each of these partially matching cases is to the case presented in the message 115. One or more embodiments may optimize the assignment of relevance scores to items by using one or more initial queries to obtain a set of possible relevant items, and then calculating relevance scores on these possibly relevant items.

Embodiments using relevance scores may use any desired function to map contextual information items and message features into relevance scores. FIG. 7 illustrates an embodiment that uses a distance metric to calculate relevance scores. A distance metric quantifies how different one set of features is from another set of features. In the embodiment shown in FIG. 7, each case in the Medical Cases Database 141 is characterized by its features Sex, Age, and Diagnosis, corresponding to the features 135 extracted from the message. The Information Selection Module 140 calculates the distance metric between each value in the set 701 of features from the Medical Case Database and the features 135 extracted from the message by Feature Extraction Module 130. FIG. 7 shows an illustrative distance metric. Embodiments may use any desired distance metric or any other desired method to select relevant contextual information items. In the embodiment shown, the distance metric d between the message features (s1, a1, d1) (corresponding to sex, age, and diagnosis) and a case in the Medical Cases Database with features (s2, a2, d2) is calculated as value 720, d[(s1,a1,d),(s2,a2,d2]. In this example, the value 720 is a sum of distance metrics 711, 712, and 713 applied to the individual features Sex, Age, and Diagnosis, respectively. This illustrative example uses an additive model for distance that effectively treats the feature differences as independent. One or more embodiments may take into account feature interrelationships as well. For example, diagnosis may be highly correlated with age or sex for certain conditions, such as prostate cancer. One or more embodiments may take feature correlations into account for example by transforming features into linearly independent factors (using for example principal components analysis), and computing distance functions on the independent factors instead of the original features.

The illustrative individual feature distance metrics 711 and 713 use auxiliary function δ* defined at 710. This function maps equal values into 0, and maps unequal values into 1. It is the inverse of the Kronecker delta function that maps equal values to 1, and unequal values to 0.

The Sex distance metric 711 is simply the δ* distance weighted by the weighting factor 20. The weighting factor 20 here is for illustration only; embodiments using feature distance metrics may use any desired weights to reflect the relative importance of each feature in determining the overall distance between items.

The Age distance metric 712 is simply the absolute value of the difference in ages. As for the Sex distance metric, the weighting here may be adjusted in different embodiments to reflect the relative importance of this feature in determining overall distance between items.

The Diagnosis distance metric 713 is an example of a hierarchical distance metric. In this example the diagnosis consists of two components: the condition (carcinoid tumor) and the body part affected (appendix for the case mentioned in the message). In the distance metric illustrated in FIG. 7, diagnoses are considered to be infinitely far apart if the conditions are different. This excludes diagnoses other than carcinoid tumor from consideration. Other embodiments may employ different metrics that may consider conditions that are similar even if they are not identical. In 713 the distance metric between two diagnoses of carcinoid tumor is simply the δ* distance between the affected body parts weighted by the value 15. This metric is for illustration only; embodiments may use any desired functions to calculate distance metrics or any relevance scores to select the most relevant contextual information items.

In FIG. 7, calculation 721 derives a relevance score from the distance metric d, by subtracting the distance from 100. Thus cases that are "closer" to the case features 135 mentioned in the message will have higher relevance. The relevance scores calculated in 721 correspond to those shown in FIG. 6.

Some embodiments may use "similarity metrics" instead of or in addition to distance metrics. A similarity metric is in a sense the inverse of a distance metric, in that larger values indicate that items are closer. As an illustrative example of a similarity metric, an embodiment that uses n-grams as features (as illustrated in FIG. 5) may also compute the n-grams of the contextual information items (or a subset of these items matching some screening criteria), and calculate a similarity metric between the n-grams of the message and the n-grams of the contextual information item. As an illustrative similarity metric, for example, let V be a vocabulary of all possible n-grams, and let message M have n-gram frequencies $f_m$: $V \rightarrow \mathbb{N}_0$ (with a frequency of 0 indicating that the n-gram does not appear in the message), and let contextual information item C have n-gram frequencies $f_c$: $V \rightarrow \mathbb{N}_0$. Then an illustrative similarity metric s(M,C) may be defined as $s(M,C) = \Sigma_{v \in V} \min(f_m(v), f_c(v))$. Effectively this metric counts the size of the intersection of the n-grams of M and the n-grams of C. Some embodiments may use variations that consider for example the fraction of matching n-grams in C instead of or in addition to the absolute count of the matching n-gram set.

Figure 8:
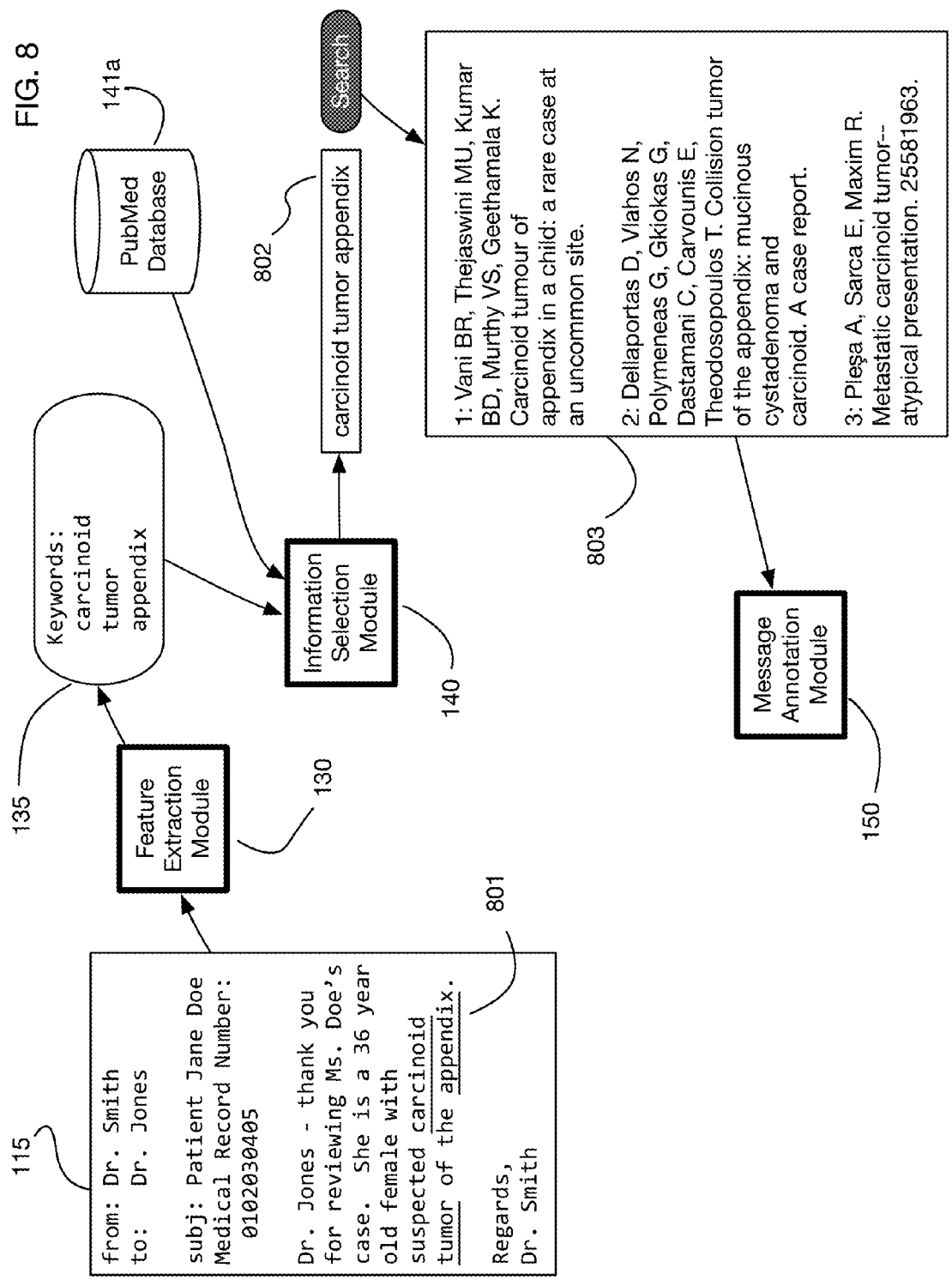
FIG. 8 illustrates an embodiment of the system that uses an external search engine to locate relevant contextual information.

One or more embodiments may use an external search engine to locate or rank relevant contextual information items. FIG. 8 illustrates a variation of the embodiment from FIG. 6 that annotates medical messages with similar cases. In the embodiment shown in FIG. 8, Feature Extraction Module 130 scans message 115 for keywords 801, to form features 135. Keywords may be identified for example using a list of known keywords, or by parsing the message using any language processing techniques known in the art. In FIG. 8, Information Selection Module 140 accesses an external search engine, here the PubMed database 141a that indexes medical journals. The PubMed database provides a search engine to search for articles using keywords (or using more complex Boolean queries). Information Selection Module 140 sends keywords 135 to the search field 802 and executes the search query. The search engine returns a list of results 803, here ranked by relevance. Message Annotation Module 150 takes a set of top-ranked results and annotates the message with these results. One or more embodiments may use any external search engine, including general-purpose web indexing engines like Google, and application-specific search engines like the PubMed system. One or more embodiments may use combinations of different search engines. One or more embodiments may construct complex queries from features 135 that use any expressions accepted by the external search engines.

Figure 9:
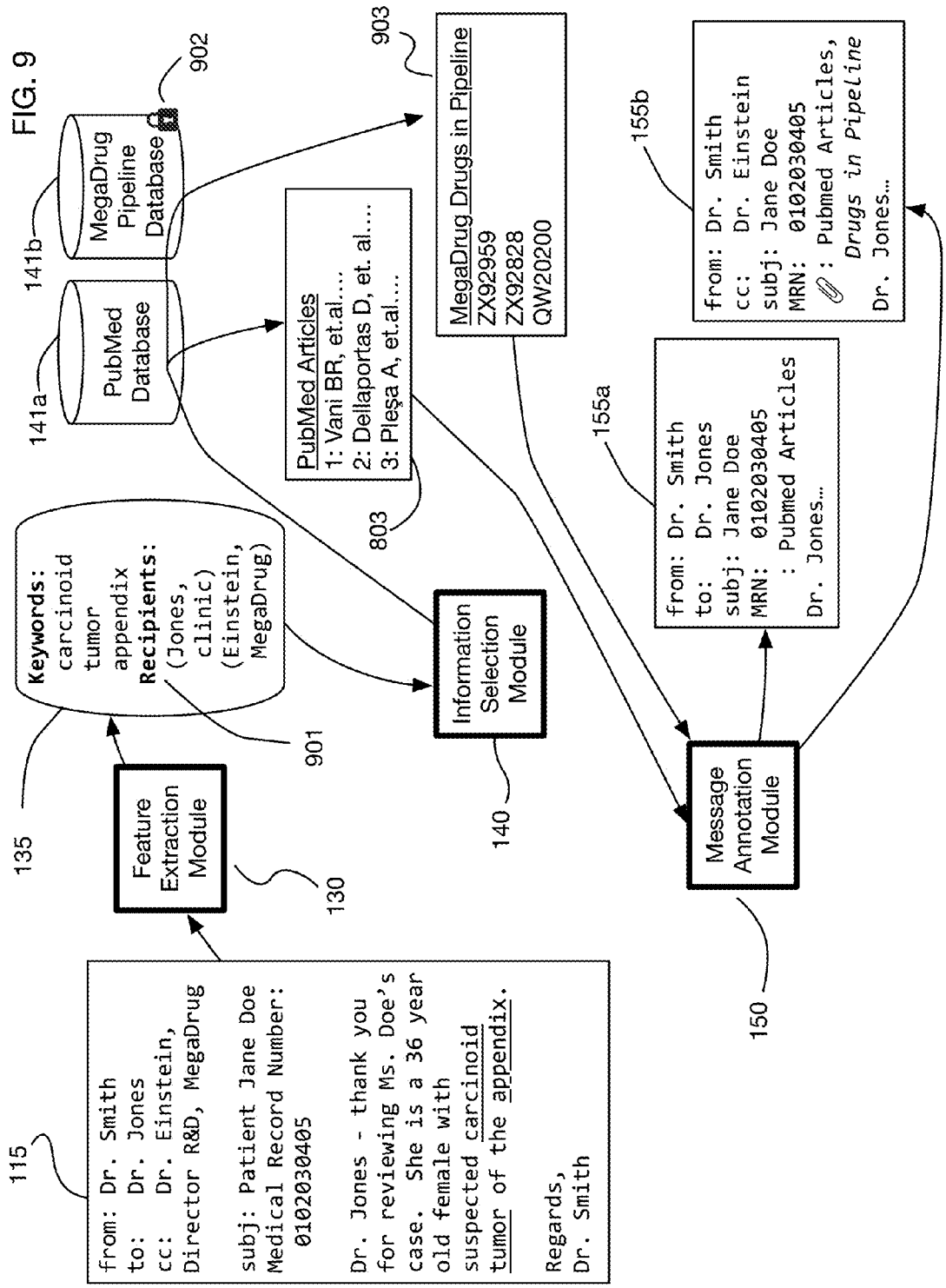
FIG. 9 illustrates an embodiment of the system that uses access rules to ensure that sensitive contextual information is sent only to authorized recipients.

FIG. 9 illustrates an embodiment of the system that extends the example shown in FIG. 8 to include a proprietary information source. In this example, there is a proprietary database 141b that contains secure information that should only be viewed by authorized users. In this example the proprietary database is an internal database of a drug development company that contains confidential information on the drugs in the company's R&D pipeline. Only employees of the company should have access to this information. Message 115 is sent to two recipients; only one of them is an employee of the drug company. Feature Extraction Module 130 extracts keywords from the message as well as the identities and organizations 901 of the two recipients. Information Selection Module 140 has access to the proprietary database 141b, and to its access control rules 902. The Information Selection Module retrieves articles 803 from the public PubMed database 141a (as in FIG. 8); any user can view these articles. It also retrieves proprietary data 903 on drugs in the company R&D pipeline that may be relevant to the case; only company personnel can view this data. Message Annotation Module 150 uses the identity of the recipients and the access control rules 902 to provide different annotations for the different recipients. Annotated message 155a includes only the public articles; annotated message 155b to the company employee also includes the proprietary data. One or more embodiments may use any access rules to filter secured data and to provide it only to authorized users. One or more embodiments may provide links to secured data sources rather than extracting the data directly; the links may for example require recipients to enter their access credentials to view the secured data.

Figure 10:
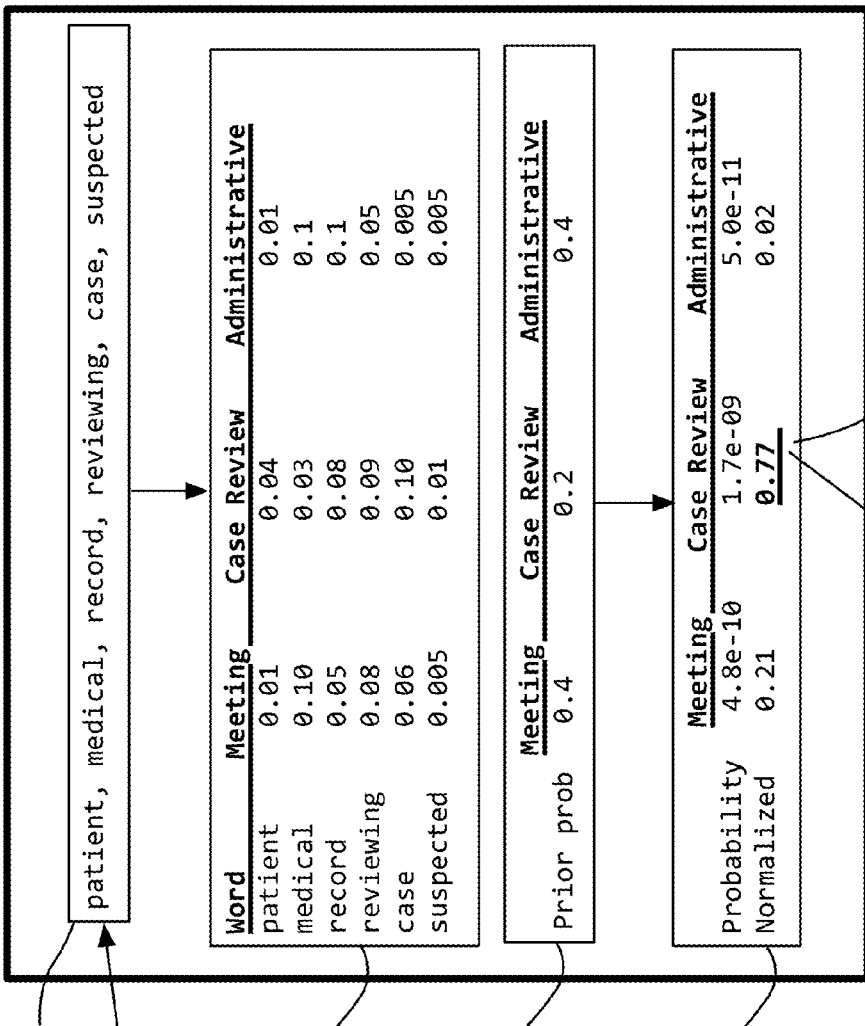
FIG. 10 illustrates an embodiment of the system that uses a naïve Bayes classifier to classify the electronic message into a category.

Some embodiments of the system may use one or more classifiers to categorize messages into classes. Classification may affect subsequent feature extraction and information selection. For example, different methods may be used to select information based on the class or classes of a message. To continue the medical example from the previous figures, physicians may send a variety of types messages to colleagues. It may be appropriate to search for matching cases only for messages that refer to a medical case. A classifier may be used to determine whether annotation with related cases is appropriate. Many types of classifiers are known in the art; embodiment may employ any of these techniques to classify messages. FIG. 10 illustrates an embodiment that uses a Naïve Bayes Classifier to classify message 115 into one of three classes: Meeting, Case Review, or Administrative. In this embodiment Feature Extraction Module 130 first extracts keywords 1001 from message 115. It then uses the probabilities 1002 of each word occurring in messages from each of the three classes, and the prior probabilities (overall relative frequencies) 1003 of each class, to calculate the probabilities and normalized probabilities 1004 that the message 115 belongs to each class. The data 1002 and 1003 may for example be obtained from a training set or from an archive of previous messages. Since the normalized probability 1005 of class "Case Review" is highest, the Feature Extraction Module classifies the message as being in this class, and the class forms part of the features 135. This example of using a Naïve Bayes Classifier using keywords is illustrative only; embodiments may use any type of classifier using any features from any of the message artifacts.

In the example embodiment of FIG. 10, the classifier is a probabilistic classifier that assigns probabilities that the message belongs to each of the possible classes. One or more embodiments may use the probabilities for additional decision-making and processing. For example, an embodiment may choose to perform message annotation only if the probability that a message is in a class exceeds a given threshold value. Such an embodiment may determine that messages that are ambiguously classified (with no dominant probability in one class) should not be annotated since the annotations may not be very relevant. One or more embodiments may use multiple classes instead of a single highest-probability class to choose features and to select information.

Figure 11:
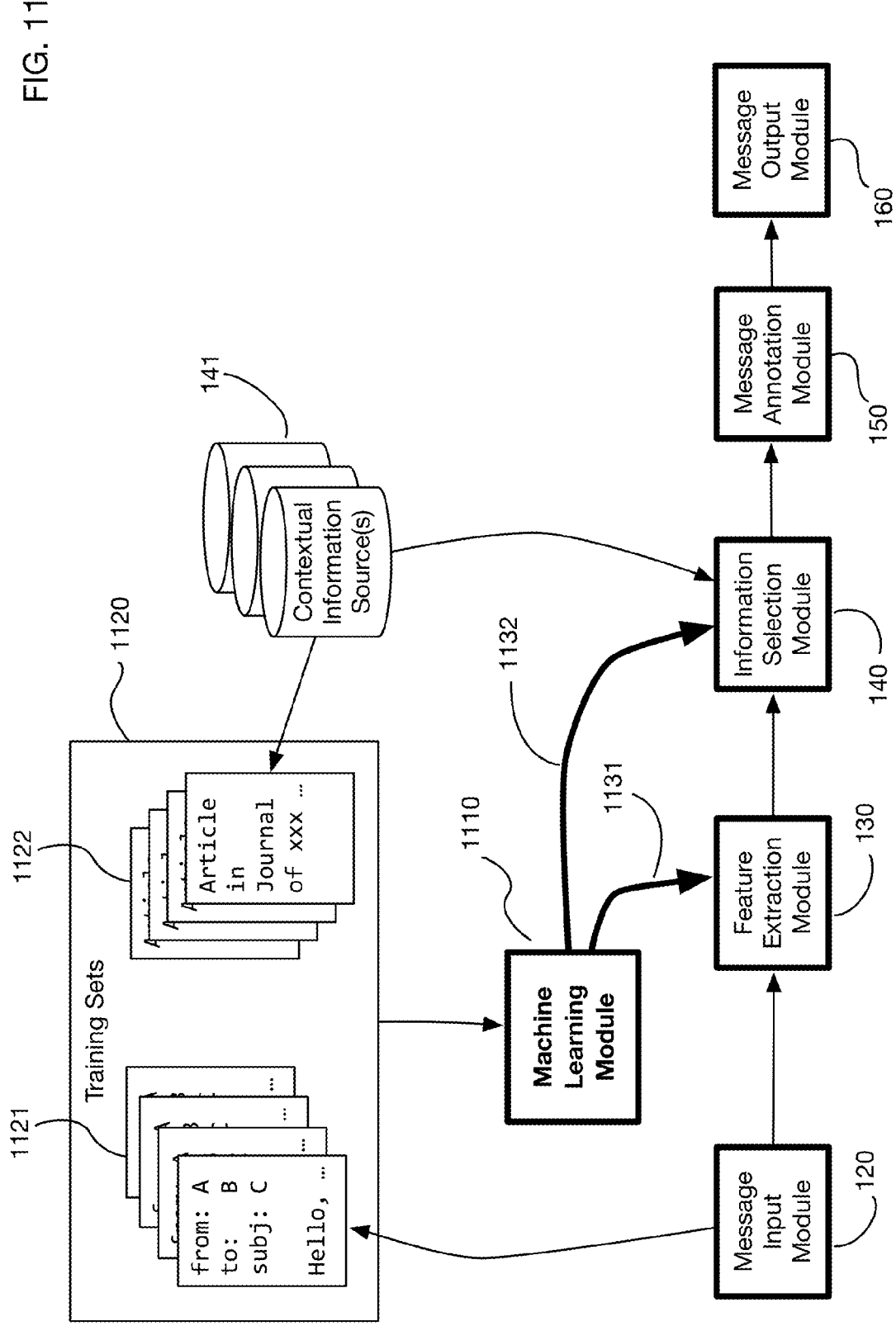
FIG. 11 shows an architectural overview of a system that includes a machine-learning module to develop rules for feature extraction and information selection from a training set.

One or more embodiments may use machine learning to develop or refine methods for feature extraction and for information selection. FIG. 11 shows an architectural overview of an embodiment that uses machine learning. In addition to the modules discussed previously, this embodiment has an additional Machine Learning Module 1110. The Machine Learning Module 1110 uses Training Sets 1120 to create or modify the methods of the Feature Extraction Module 130 and the Information Selection Module 140. Rules, methods, data, procedures, software, or other information is propagated on path 1131 from the Machine Learning Module to the Feature Extraction Module, and on path 1132 from the Machine Learning Module to the Information Selection Module. Some embodiments may use Machine Learning only for one of the Feature Extraction or Information Selection Modules. The Training Sets 1120 may consist of any data that can be used to develop or modify these methods. As illustrated in FIG. 11, two potential sources for Training Set information are selected items 1122 from the Contextual Information Sources 141 and archives 1121 of messages received by the Message Input Module 120. Embodiments may use other sources of training information as desired.

Many techniques for machine learning are known in the art. Embodiments of the system may use any of these techniques, including for example, without limitation, supervised learning, unsupervised learning, neural networks, support vector machines, classifiers, linear and nonlinear classifiers, nearest neighbor methods, clustering, decision trees, Bayesian networks, hidden Markov models, logic programming, and genetic algorithms.

As a simple example of a machine learning approach, an embodiment of the system may use a training set with hand-selected examples of messages and corresponding examples of relevant contextual information items. The Machine Learning Module may then use any machine learning techniques with these examples to infer generalized rules for extracting features and selecting information. As another example, an embodiment of the system may use message archives as a training set, and infer the topics each user is most interested in from the topics of messages sent from or sent to that user. The system may then tailor information selection rules to provide annotations to each user that focus on that user's preferred topics.

Figure 12:
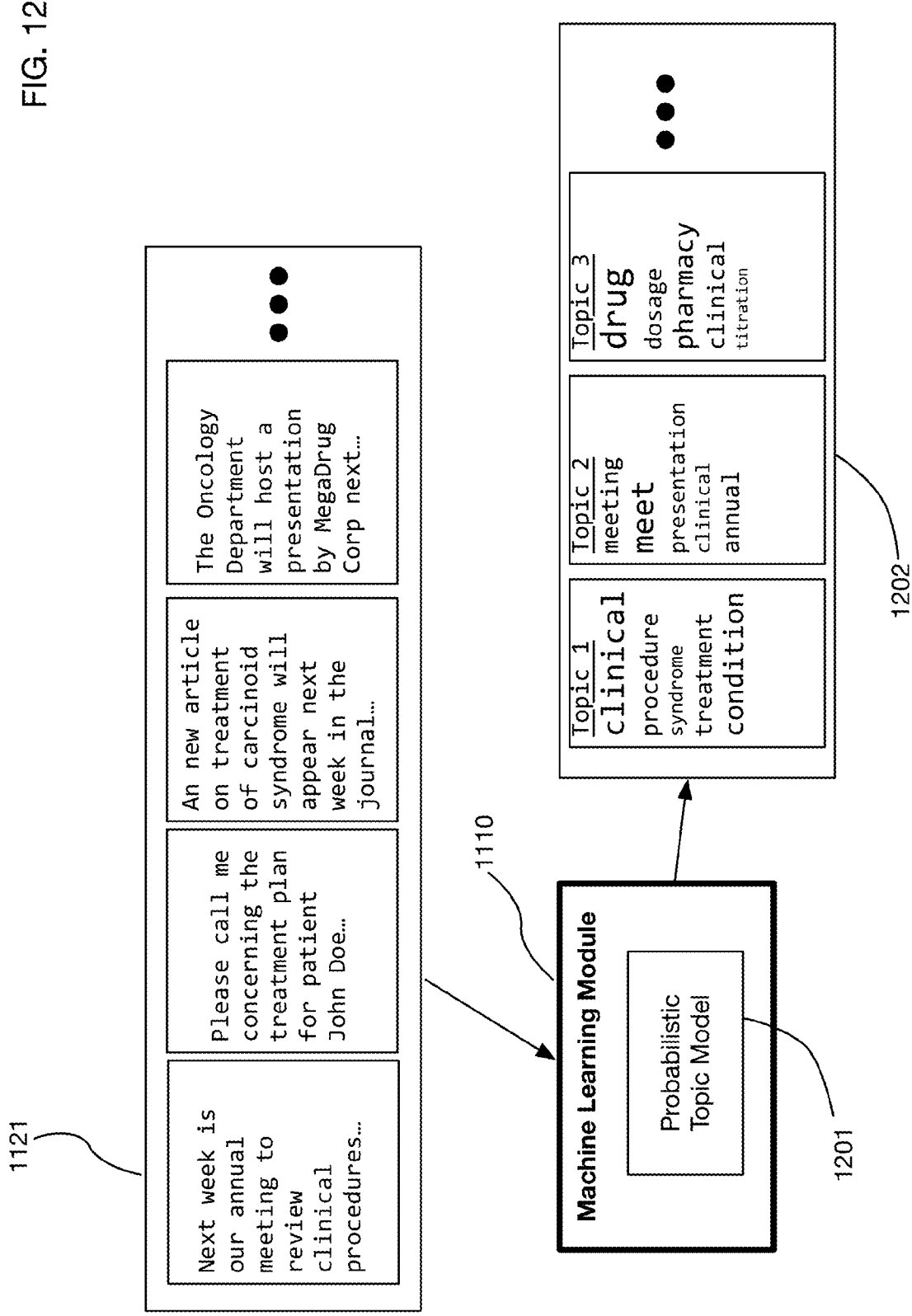
FIG. 12 illustrates an embodiment of the system that uses a probabilistic topic model to learn a set of topics from a training set.

FIG. 12 illustrates an embodiment of the system that uses a probabilistic topic model 1201 as part of the Machine Learning Module 1110. Probabilistic topic models process large numbers of documents to infer a set of topics from the patterns of common words associated with each topic. These topics can then be used for probabilistic classification of other documents. As shown in FIG. 12, messages 1121 from the message archive are provided to the Machine Learning Module 1110. Using the probabilistic topic model 1201, the system infers a set of topics 1202, with word frequencies (indicated in FIG. 12 by the size of each word) associated with each topic. This procedure can be fully automated. For example, the three topics shown in FIG. 12 may correspond respectively to cases, meetings, and drugs. Classifying future messages into these topics (or classifying them as mixtures of topics) may be used to extract features and select relevant information for annotation. One or more embodiments may use hierarchical topic models that generate or use a topic hierarchy; these models may classify documents into topics at various levels of the hierarchy.

Figure 13:
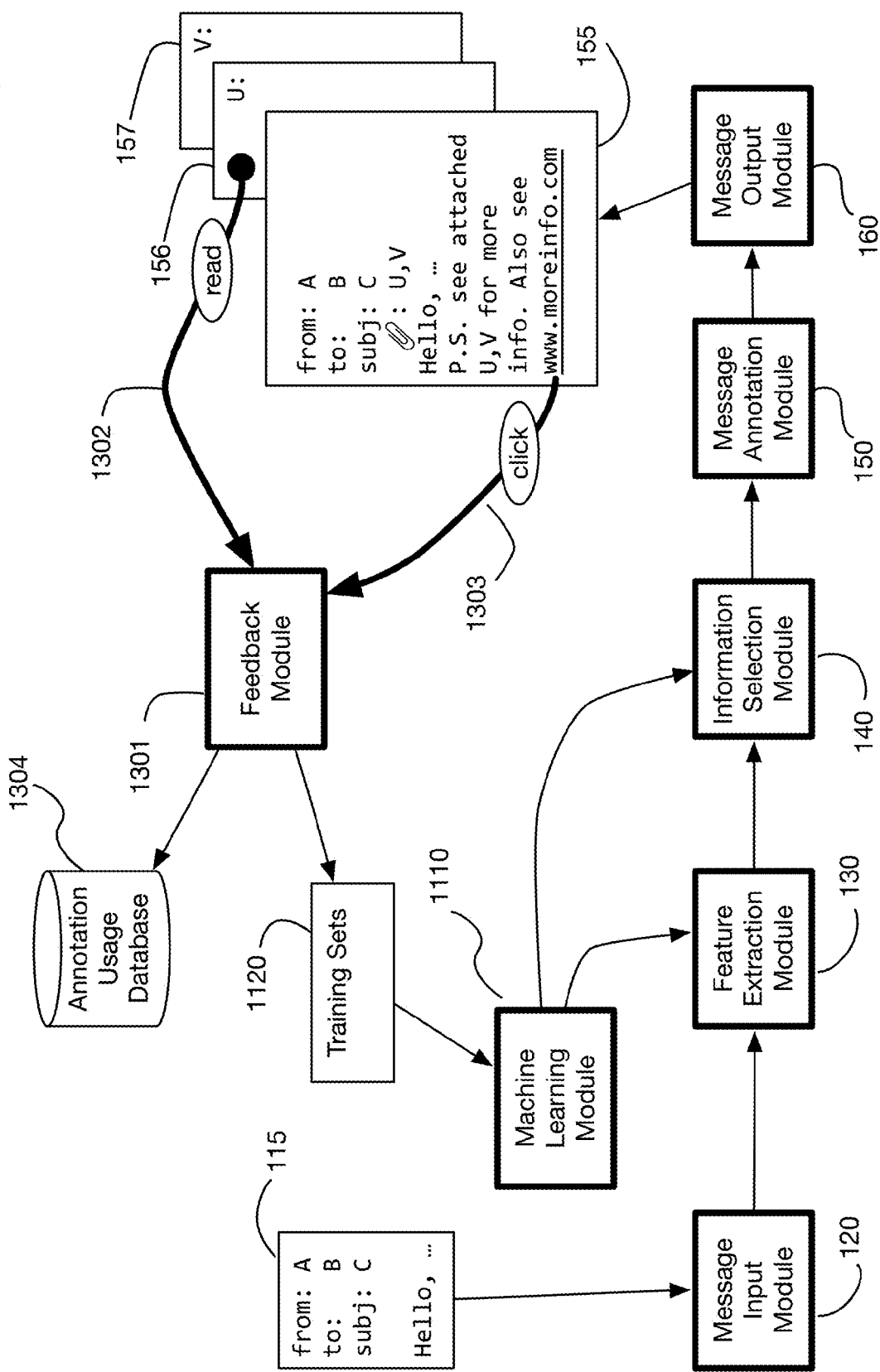
FIG. 13 shows an architectural overview of a system that includes a feedback module that tracks when annotations are accessed by the recipients.

A key objective of one or more embodiments of the system is to provide annotations that are useful to the recipients. One measure of the usefulness of an annotation is whether it is viewed or used by the recipients. FIG. 13 illustrates an architectural overview of an embodiment of the system that incorporates a Feedback Module 1301 to measure this usage. In this embodiment, annotation usage data from recipients is tracked and fed back to the Feedback Module. For example, for annotations that include a hyperlink, the system may track when the hyperlink is clicked and send this information to the Feedback Module on path 1303. For annotations that are message attachments, the system may track when attachments are downloaded or viewed, and send this information to the Feedback Module on path 1302. Techniques to measure clicking of links may include for example, without limitation, integrating a component of a Feedback Module into a recipient's browser or email client, or inserting as the annotation a link to a proxy that records usage and then forwards the request to the original link. Techniques to measure viewing or downloading of attachments may include for example, without limitation, integrating a component of a Feedback Module into a recipient's email client or file system, or into a recipient's email server so that it downloads attachments on demand and records their usage.

In the embodiment shown in FIG. 13, Feedback Module 1301 provides feedback data to the training sets 1120 used by Machine Learning Module 1110. This feedback path provides a closed-loop system that learns which annotations are useful to recipients and adjusts the annotation system accordingly via machine learning to improve future annotations. Feedback Module 1301 also logs feedback in Annotation Usage Database 1304. System administrators or users may use this database to review and analyze annotation usage. Embodiments may attach various reporting, querying, and data mining tools to the database 1304 to facilitate these analyses.

Figure 14:
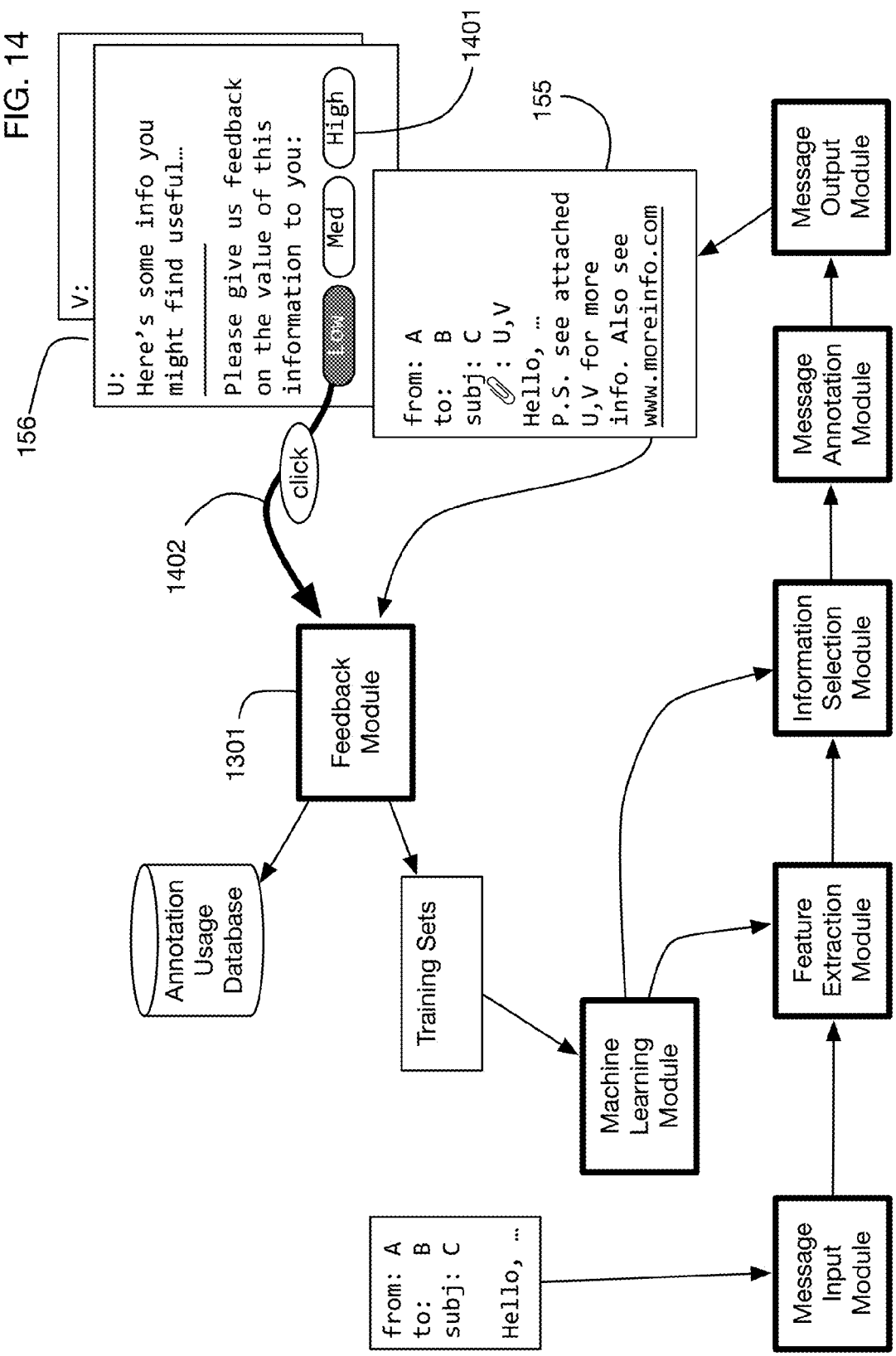
FIG. 14 illustrates an embodiment of the system that allows recipients to provide direct feedback on how valuable they found the information added to the messages.

FIG. 14 illustrates a variation of the embodiment shown in FIG. 13 that supports manual feedback from users on the quality of the annotations. In this embodiment, annotation 156 includes rating buttons 1401 that recipients may click to rate the value of the annotation. Ratings are sent to the Feedback Module 1301 on path 1402. These manual user ratings may be combined with automated feedback of usage as described in FIG. 13. One or more embodiments may use any technique to collect feedback from recipients and to provide this information to the Feedback Module. For example, users may be asked to provide comments in addition to ratings, or they may be periodically asked to fill out surveys collecting their feedback on the annotation system.

Figure 15:
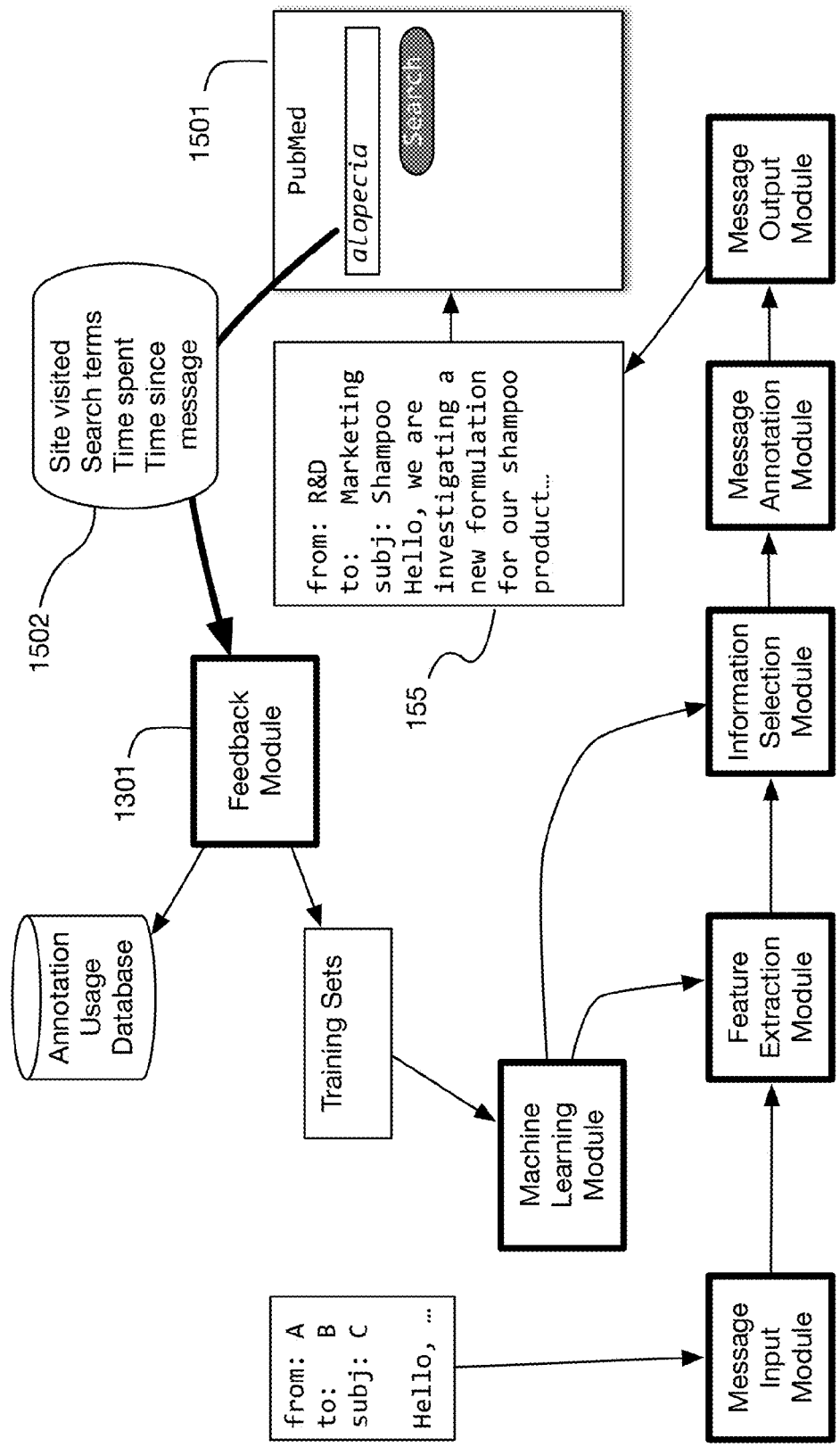
FIG. 15 illustrates an embodiment of the system that tracks users' searches after they receive a message, in order to improve future annotations.

FIG. 15 illustrates another variation of an embodiment that collects feedback. In this embodiment, the system tracks activities of a recipient after he or she receives a message, to determine the information sought by or used by that recipient. The Feedback Module collects this information so that future annotations can be improved to perform these searches in advance for recipients. In the embodiment shown, after receiving message 155 the recipient performs a search on PubMed at 1501. Such a search may be performed for example on the user's web browser. In this embodiment, a component is integrated into the user's browser or into a proxy server to track web page visits and searches. By correlating these visits and searches in time with the receipt of messages 155, the system can infer that the visits and searches may be related to the message. Information 1502 containing data on the user's search activities may be sent to the Feedback module 1301. One or more embodiments may track recipients' access to any type of information after receiving a message, including information on web usage, web searches, local or remote file system usage or searches, database queries, or any other search or use of information.

Figure 16:
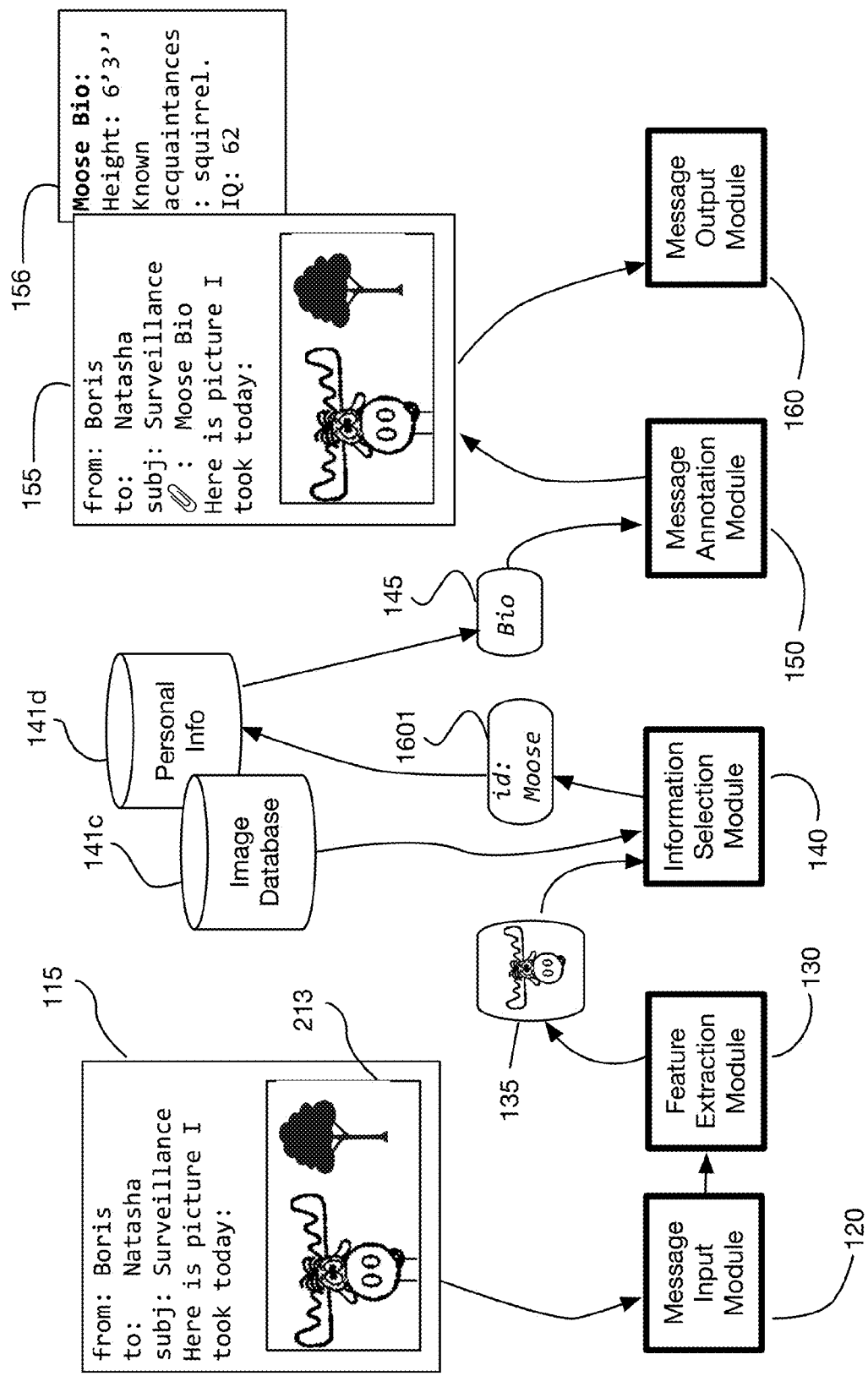
FIG. 16 illustrates an embodiment of the system that uses image recognition to identify an object in an image and to annotate the message with information about that object.

One or more embodiments of the system may analyze media contained in messages to extract message features and to select contextual information for annotations. Media may include for example, without limitation, images, video, audio, graphics, or combinations thereof. FIG. 16 illustrates an embodiment that includes an image 213 in message 115. Feature Extraction Module 130 uses face recognition techniques known in the art to extract the sub-image 135 with a picture of an unidentified person's face. Embodiments may use any image processing techniques to extract sub-images of interest, or to extract any types of features from images included in or attached to incoming messages. The feature 135 with the face image is provided to Information Selection Module 140, which has an interface to an Image Database 141c, and to a database of Personal Information 141d on subjects. In this example, the Information Selection Module searches Image Database 141c for a face image matching the feature 135. Techniques for image matching in general, and for face recognition in particular, are known in the art; embodiments may use any of these techniques to associate images or image features with identifiable objects or with other images. In the example of FIG. 16, the image search of database 141c yields identity 1601 of the image. The Information Selection Module then uses this identity to retrieve biographical data 145 from database 141d. This biographical data is attached to message 155 as annotation 156. Applications of the features illustrated in FIG. 16 may include, for example, identifying "persons of interest" for law enforcement or other investigations, and annotating messages with additional information about these persons.

One or more embodiments of the invention may use location data in messages to annotate messages with contextual information about items in proximity to the location. FIG. 17 illustrates an embodiment with an address included in message 115. Feature Extraction Module 130 recognizes the address using text processing and recognition techniques, and it converts the address into latitude and longitude features 135. Embodiments may use external information sources to map addresses or other location data into any desired format, such as longitude and latitude. Information Selection Module 140 has an interface to database 141e that contains items tagged with geographical information. Using features 135, the Information Selection Module retrieves a set of local attractions 145 that are nearby to location 135. Techniques for retrieving data in the vicinity of a location are known in the art and are supported directly by many geographical information systems. The local attractions 145 are then attached to message 155 as annotation 156. One or more embodiments may use other features in addition to locations to determine the types of relevant information in proximity to the location, and to determine an appropriate radius or area around the location for retrieving information. For example, in the FIG. 17 the context of message 115 is that it concerns a retreat; the annotation system may infer this context from keywords in the message and use the context to select only recreational-themed items within a 3-mile radius of the address.

One or more embodiments may derive locations associated with a message even if these locations are not explicitly identified in the message artifacts. For example, the home office location of a sender or receiver may be known; these locations may be used in generating message annotations. For mobile users, the current location of a sender or receiver may be available to the system, for example from GPS receivers embedded in a mobile device; the system may use these current locations to identify relevant contextual information. As an example, a sender may send a message to a receiver with the contents "I am here; meet me now." Even if the current location of the sender is not explicitly included in the message, the system may obtain this current sender location and for example annotate the message with a map to the sender's location.

While the invention herein disclosed has been described by means of specific embodiments and applications thereof, numerous modifications and variations could be made thereto by those skilled in the art without departing from the scope of the invention set forth in the claims.

What is claimed is:

1. A system for annotation of electronic messages with contextual information comprising:
   a computer system comprising at least one processor, at least one tangible memory device, and at least one network interface;
   an interface to one or more contextual information sources that communicates over one or more of said at least one network interface;
   a processor that
      receives an electronic message on one or more of said at least one network interface,
         wherein said electronic message contains medical information related to a medical record or legal information related to a legal case; and,
      said processor selects information on other cases similar to said medical record or said legal case from an external database;
      wherein said electronic message comprises one or more message artifacts, and
      wherein said one or more message artifacts comprise:
         one or more senders, one or more sender addresses,
         one or more sender organizations,
         one or more recipients,
         one or more recipient addresses,
         one or more recipient organizations,
         a subject,
         a contents,
         one or more message body parts,
         a message thread,
         an event,
         a timestamp,
         a location,
         one or more links,
         an importance indicator,
         one or more media types, a set of message metadata, and one or more attachments;

analyzes said one or more message artifacts of said electronic message;

extracts n-grams appearing in said one or more message artifacts in said electronic message;

forms a frequency distribution of said n-grams, generates a set of features associated with said one or more message artifacts from said frequency distribution of said n-grams;

performs one or more queries against one or more external search engines, wherein said one or more queries are directed towards a medical database or a legal database and are based on said set of features using search terms, and wherein said search terms are derived from said set of features of said electronic message;

selects one or more contextual information items from said one or more contextual information sources based on said set of features;

calculates a relevance score for each of a set of available contextual information items based on said one or more features associated with said one or more message artifacts;

ranks said set of available context information items based on said relevance score;

selects a top-ranked subset of said set of available contextual information items;

transforms said electronic message by adding said one or more contextual information items to create an annotated electronic message comprising annotating said electronic message with said top-ranked subset of said set of available contextual information items to provide said electronic message with relevant data to aid said at least one or more recipients to utilize said electronic message, understand a meaning of said electronic message or respond to said electronic message;

wherein said relevance score is a similarity metric or a distance metric between said set of features associated with said one or more message artifacts and a corresponding set of features associated with or calculated from each of said available contextual information items;

transmits said annotated electronic message on one or more of said at least one network interface to at least said one or more recipients;

tracks whether and how said one or more recipients use said one or more contextual information items of said electronic message that is annotated as feedback; and, accepts input from said one or more recipients as direct user feedback that allows users to indicate or rate a usefulness or relevance of said one or more contextual information as feedback data to improve feature extraction and information selection.

2. The system for annotation of electronic messages with contextual information of claim 1, wherein said processor attaches said one or more contextual information items to said electronic message as attachments containing said one or more contextual information items or links or references to said one or more contextual information items.

3. The system for annotation of electronic messages with contextual information of claim 1, wherein said processor inserts said one or more contextual information items or links or references to said one or more contextual information items into said contents of said electronic message.

4. The system for annotation of electronic messages with contextual information of claim 1, wherein the length of each of said n-grams is between a minimum n-gram length and a maximum n-gram length selected by said processor.

5. The system for annotation of electronic messages with contextual information of claim 1, wherein
said set of features comprises said one or more recipients, and other features extracted from said electronic message;
said one or more contextual information sources comprise access rules that indicate an accessible subset of said contextual information items that each of said one or more recipients is permitted to access; and,
said processor selects a set of contextual information items for each of said one or more recipients from the accessible subset of said contextual information items for that recipient, based on said other features extracted from said electronic message.

6. The system for annotation of electronic messages with contextual information of claim 1, wherein said processor categorizes said electronic message or an artifact of said electronic message into one or more classes using a classifier.

7. The system for annotation of electronic messages with contextual information of claim 6, wherein said classifier is a probabilistic classifier, and said processor annotates said electronic message only if the probability of a correct classification from said probabilistic classifier exceeds a threshold probability.

8. The system for annotation of electronic messages with contextual information of claim 1, wherein said processor generates one or more topics associated with said electronic message using a probabilistic topic model.

9. The system for annotation of electronic messages with contextual information of claim 1, wherein said processor further comprises a training set that develops or revises methods for feature extraction and information selection.

10. The system for annotation of electronic messages with contextual information of claim 9, wherein said processor tracks usage of said one or more contextual information items by said one or more recipients, wherein data received as feedback by said processor is used to revise said methods for feature extraction and information selection.

11. The system for annotation of electronic messages with contextual information of claim 9, wherein said processor
monitors the information searches of said one or more recipients after they receive said annotated electronic message; and
provides data on said information searches to revise said methods for feature extraction and information selection.

12. The system for annotation of electronic messages with contextual information of claim 1, wherein
said electronic message contains one or more media items, each comprising one or more images, videos, audio clips, or any combinations thereof;
said processor analyzes said one or more media items to extract one or more segments of said one or more media items that represent one or more objects contained in said one or more media items; and
said processor compares said one or more segments of said one or more media items to said contextual information sources to identify said one or more objects and to select contextual information about said one or more objects.

13. The system for annotation of electronic messages with contextual information of claim 1, wherein said processor extracts or derives one or more locations from said one or more message artifacts;

said one or more contextual information sources comprise location-tagged contextual information items; and, said processor selects a set of said location-tagged contextual information items with location-tags that are equal to or in proximity to said one or more locations.

14. The system for annotation of electronic messages with contextual information of claim 13, wherein said derives one or more locations from said one or more message artifacts comprises obtain the location of one or more of said one or more senders or of said one or more receivers from one or more of location configuration information describing usual or standard locations for one or more of said one or more senders or of said one or more receivers;

current sender location information describing the location of said one or more senders at the time said electronic message is composed or sent; and, current receiver location information describing the location of said one or more receivers at the time said annotated electronic message is received or read.

15. The system for annotation of electronic messages with contextual information of claim 1, wherein said one or more message artifacts comprises a plurality of message artifacts, and wherein said processor assigns different weights to said n-grams extracted from different message artifacts of said plurality message artifacts.

16. The system for annotation of electronic messages with contextual information of claim 1, wherein said processor preprocesses said one or more message artifacts prior to extracting said n-grams.

* * * * *

UNITED STATES PATENT AND TRADEMARK OFFICE
CERTIFICATE OF CORRECTION

PATENT NO. : 9,628,419 B2  
APPLICATION NO. : 14/813034  
DATED : April 18, 2017  
INVENTOR(S) : Nathaniel S. Borenstein et al.

Page 1 of 1

It is certified that error appears in the above-identified patent and that said Letters Patent is hereby corrected as shown below:

At Column 21, Claim number 1, Line number 1, please replace "and" with --or--

Signed and Sealed this  
Third Day of November, 2020

Andrei Iancu  
*Director of the United States Patent and Trademark Office*